US012374281B2

(12) United States Patent
Chen

(10) Patent No.: US 12,374,281 B2
(45) Date of Patent: Jul. 29, 2025

(54) DISPLAY PANEL AND DISPLAY APPARATUS

(71) Applicant: Tianma Advanced Display Technology Institute (Xiamen) Co., Ltd., Fujian (CN)

(72) Inventor: Peixuan Chen, Fujian (CN)

(73) Assignee: Tianma Advanced Display Technology Institute (Xiamen) Co., Ltd., Fujian (CN)

( * ) Notice: Subject to any disclaimer, the term of this patent is extended or adjusted under 35 U.S.C. 154(b) by 0 days.

(21) Appl. No.: 18/641,884

(22) Filed: Apr. 22, 2024

(65) Prior Publication Data

US 2024/0274071 A1 Aug. 15, 2024

(30) Foreign Application Priority Data

Feb. 2, 2024 (CN) ......................... 202410153875.9

(51) Int. Cl.
*G09G 3/32* (2016.01)
*G09G 3/3225* (2016.01)

(52) U.S. Cl.
CPC ............. *G09G 3/3225* (2013.01); *G09G 3/32* (2013.01); *G09G 2300/0426* (2013.01);
(Continued)

(58) Field of Classification Search
CPC ...... G09G 3/32-3291; G09G 2300/0421-043; G09G 2300/0439;
(Continued)

(56) References Cited

U.S. PATENT DOCUMENTS

2017/0003806 A1* 1/2017 Kim ..................... G09G 3/3233
2022/0384401 A1* 12/2022 Bok ..................... G09G 3/3233
2023/0418058 A1* 12/2023 Takahata ................ G09G 3/002

FOREIGN PATENT DOCUMENTS

CN 113270070 A * 8/2021 ........... G09G 3/3208

OTHER PUBLICATIONS

English translation of CN-113270070-A (Year: 2021).*

* cited by examiner

*Primary Examiner* — Nathan Danielsen
(74) *Attorney, Agent, or Firm* — CHRISTENSEN O'CONNOR JOHNSON KINDNESS PLLC

(57) ABSTRACT

A display panel and a display apparatus. The display panel comprises a temperature detection structure, a first connection electrode, and a second connection electrode, where the temperature detection structure is connected to the first connection electrode and the second connection electrode, respectively. In the embodiments of the present application, the temperature detection structure is provided in the display apparatus, so that the temperature detection structure can be used to detect temperatures at positions where light-emitting devices are located, and perform targeted color luminance compensation for the light-emitting devices with different light-emitting colors based on the detected temperatures and the temperature characteristics of the light-emitting devices, which is conducive to making the color luminance of the display panel meet a specification requirement at different operating temperatures, and reducing the problem of color deviation that is prone to occur in the display panel at a high temperature.

20 Claims, 20 Drawing Sheets

(52) U.S. Cl.
CPC ............... *G09G 2320/0233* (2013.01); *G09G 2320/041* (2013.01); *G09G 2320/0666* (2013.01); *G09G 2330/12* (2013.01)

(58) Field of Classification Search
CPC ... G09G 2320/0233; G09G 2320/0242; G09G 2320/0271; G09G 2320/0276; G09G 2320/029–041; G09G 2320/066; G09G 2320/0666; G09G 2320/0693; G09G 2330/10; G09G 2330/12
See application file for complete search history.

DISPLAY PANEL AND DISPLAY APPARATUS

CROSS-REFERENCE TO RELATED DISCLOSURES

The present application claims priority to Chinese Patent Application No. 202410153875.9, filed on Feb. 2, 2024, the content of which is incorporated herein by reference in its entirety.

TECHNICAL FIELD

The present application relates to the field of display technology, and in particular to a display panel and a display apparatus.

BACKGROUND

In the field of display technology, display panels conventionally suffer from a problem with color deviation at a high temperature. On one hand, as an ambient temperature rises, a white balance that is well calibrated at a normal temperature may deviate from specification at a higher temperature, and on the other hand, an uneven distribution of temperature in display panels may result in an uneven of distribution of screen chromaticity. Therefore, a solution is urgently needed.

SUMMARY

In view of this, embodiments of the present application provide a display panel and a display apparatus, to resolve the problem of color deviation at a high temperature with a display panel.

According to a first aspect, an embodiment of the present application provides a display panel comprising a temperature detection structure, a first connection electrode, and a second connection electrode. The temperature detection structure is connected to the first connection electrode and the second connection electrode, respectively.

According to a second aspect, an embodiment of the present application provides a display apparatus comprising the display panel provided in the first aspect.

In the embodiments of the present application, the temperature detection structure is provided in the display apparatus, so that the temperature detection structure can be used to detect temperatures at positions where light-emitting devices are located, and perform targeted color luminance compensation for the light-emitting devices with different light-emitting colors based on the detected temperatures and the temperature characteristics of the light-emitting devices, which is conducive to making the color luminance of the display panel meet a specification requirement at different operating temperatures, and reducing the problem of color deviation that is prone to occur in the display panel at a high temperature.

BRIEF DESCRIPTION OF DRAWINGS

To describe the technical solutions in the embodiments of the present application more clearly, the following briefly describe the accompanying drawings required for describing the embodiments. Apparently, the accompanying drawings in the following description are merely some embodiments of the present application, and those of ordinary skill in the art may still derive other accompanying drawings from these accompanying drawings without creative efforts.

DESCRIPTION OF EMBODIMENTS

For a better understanding of the technical solutions of the present application, the following describes in detail the embodiments of the present application with reference to the accompanying drawings.

It should be noted that, the described embodiments are merely some but not all of the embodiments of the present application. Based on the embodiments of the present application, all other embodiments obtained by those ordinary skilled in the art without creative efforts fall within the protection scope of the present application.

Terms in the embodiments of the present application are merely used to describe the specific embodiments, and are not intended to limit the present application. Unless otherwise specified in the context, words, such as "a", "the", and "this", in a singular form in the embodiments and appended claims of the present application comprise plural forms.

It should be understood that the term "and/or" used in this specification merely describes associations between associated objects, and it indicates three types of relationships. For example, A and/or B may indicate that A exists alone, A and B coexist, or B exists alone. In addition, the character "/" used in this specification generally indicates that the associated objects are in an "or" relationship.

In the field of display technology, a pixel unit of a display panel generally comprises a red light-emitting device, a green light-emitting device, and a blue light-emitting device. Because brightness and chromaticity of the red light-emitting device, the green light-emitting device, and the blue light-emitting device vary with temperature, a white balance well calibrated at a normal temperature deviates at a higher ambient temperature. In addition, various areas of the display panel may have an uneven distribution of temperature due to different display screens, so that the display panel suffers the problem of chromaticity unevenness.

The applicant of the present application provides a solution to the problem existing in the prior art through careful and in-depth research.

Figure 1:
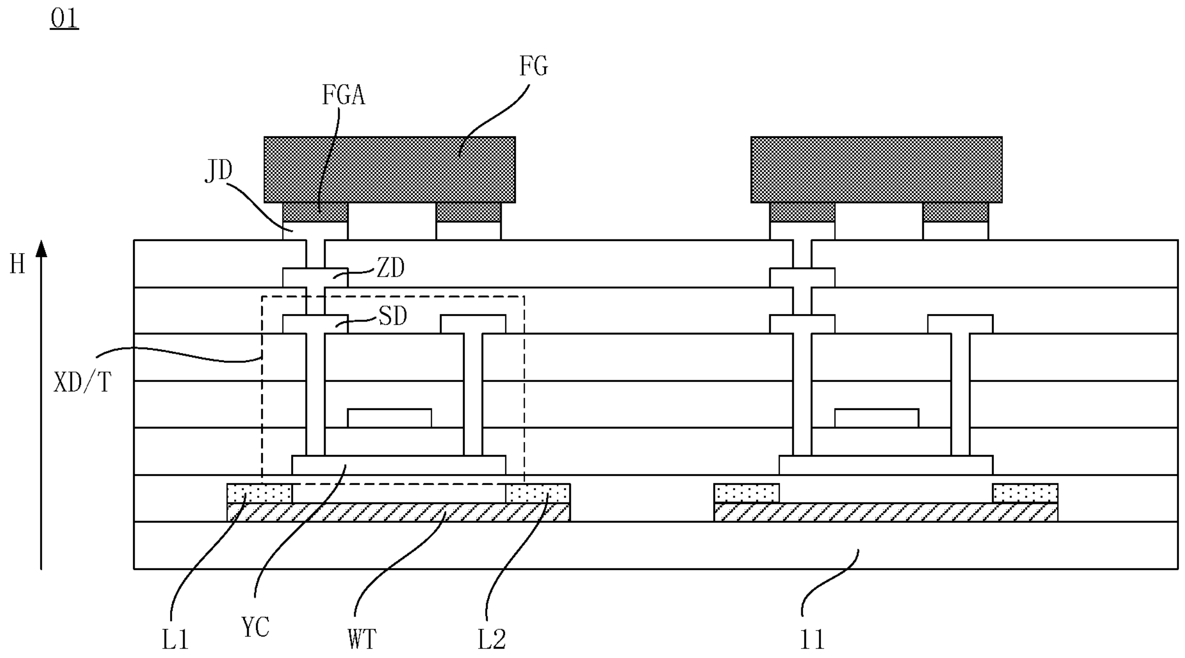
FIG. 1 is a structural schematic diagram of a display panel provided by an embodiment of the present application.
Figure 2:
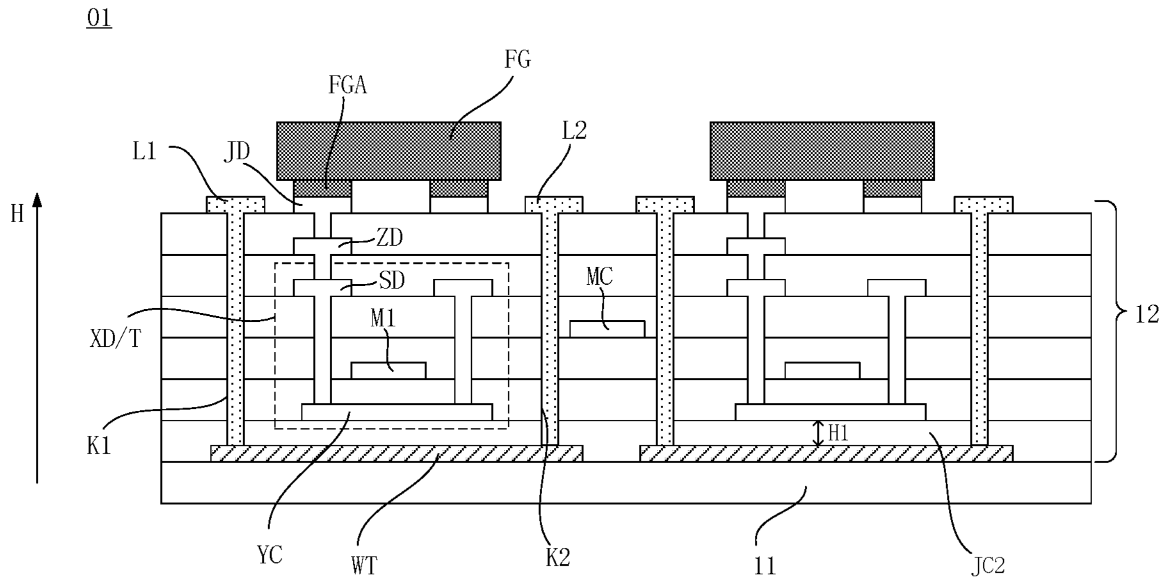
FIG. 2 is a structural schematic diagram of another display panel provided by an embodiment of the present application.

FIG. 1 is a structural schematic diagram of a display panel provided by an embodiment of the present application, and FIG. 2 is a structural schematic diagram of another display panel provided by an embodiment of the present application.

An embodiment of the present application provides a display panel 01, which, as shown in FIG. 1 and FIG. 2, comprises a temperature detection structure WT, a first connection electrode L1, and a second connection electrode L2, and the temperature detection structure WT is connected to the first connection electrode L1 and the second connection electrode L2, respectively. The first connection electrode L1 and the second connection electrode L2 may be configured for transmitting electrical signals to the temperature detection structure WT.

The first connection electrode L1 and the second connection electrode L2 may be used as a positive electrode and a negative electrode of the temperature detection structure WT, respectively, and a current is applied to the temperature detection structure WT through the first connection electrode L1 and the second connection electrode L2, to detect the voltage across the temperature detection structure WT. A material with a resistivity that varies with temperature may be selected for the temperature detection structure WT, from a detected voltage across the temperature detection structure WT, a resistance of the temperature detection structure WT can be derived, and from which a temperature of the temperature detection structure WT can be converted.

Optionally, as shown in FIG. 1, the first connection electrode L1 and the second connection electrode L2 are directly lapped-over the temperature detection structure WT. That is, immediately after the completion of the preparation of the temperature detection structure WT, the first connection electrode L1 and the second connection electrode L2 are prepared, and no other film layer is provided between the first connection electrode L1 and the second connection electrode L2 and the temperature detection structure WT.

Optionally, as shown in FIG. 2, the first connection electrode L1 and the temperature detection structure WT are provided in different layers, and the second connection electrode L2 and the temperature detection structure WT are provided in different layers. That is, after the completion of the preparation of the temperature detection structure WT, at least one insulation layer may be prepared, and then the first connection electrode L1 and the second connection electrode L2 are prepared. The first connection electrode L1 and the second connection electrode L2 may be connected to the temperature detection structure WT through via holes. In this case, the first connection electrode L1 and the second connection electrode L2 may be located on a same side of a film layer where the temperature detection structure WT is located, or may be located on opposite sides of a film layer where the temperature detection structure WT is located. Certainly, the first connection electrode L1 and the second connection electrode L2 may be provided in a same layer, or may be provided in different layers. The film layer(s) of the first connection electrode L1 and the second connection electrode L2 may be flexibly provided as required.

It should be noted that, of the first connecting electrode L1 and the second connecting electrode L2, it is also possible to provide one of them to be directly lapped-over the temperature detecting structure WT, and the other one and the temperature detecting structure WT on different layers.

Still referring to FIG. 1 and FIG. 2, the display panel 01 further comprises a light-emitting device FG. The light-emitting device FG may be a micro light-emitting diode (Micro-LED), or may be an organic light-emitting diode (OLED) or a sub-millimeter light-emitting diode (Mini-LED). The temperature detection structure WT is located in the vicinity of the light-emitting device FG for detecting a temperature at the position where the light-emitting device FG is located. The temperature at the position where the temperature detection structure WT is located may be approximately a temperature at the position where the light-emitting device FG is located. The temperature at the position where the temperature detection structure WT is located may also be converted into the temperature on the surface of the display panel 01.

Optionally, as shown in FIG. 1 and FIG. 2, in a thickness direction H of the display panel 01, the temperature detection structure WT may overlap the light-emitting device FG, and the temperature detection structure WT may be located on a side of the light-emitting device FG away from a light-emitting surface, and the temperature at the position where the light-emitting device FG is located is detected without affecting light emitting from the light-emitting device FG. Certainly, the temperature detection structure WT may be alternatively located between two adjacent light-emitting devices FG, provided that normal light emitting from the light-emitting devices FG are not affected.

In the embodiment of the present application, the temperature detection structure WT is provided on the display panel 01, so that the temperature detection structure WT can be used to detect temperatures at positions where light-emitting devices FG are located, and perform targeted color luminance compensation for the light-emitting devices FG with different light-emitting colors based on the detected temperatures and the temperature characteristics of the light-emitting devices FG, which is conducive to making the color luminance of the display panel 01 meet a specification requirement at different operating temperatures, and reducing the problem of color deviation that is prone to occur in the display panel 01 at a high temperature.

For example, at a high temperature, considering that luminance of the red light-emitting device is more attenuated, drive currents of the green light-emitting device and the blue light-emitting device may be reduced to a certain extent, so as to reduce luminance of the green light-emitting device and the blue light-emitting device, thereby reducing the color deviation.

Figure 3:
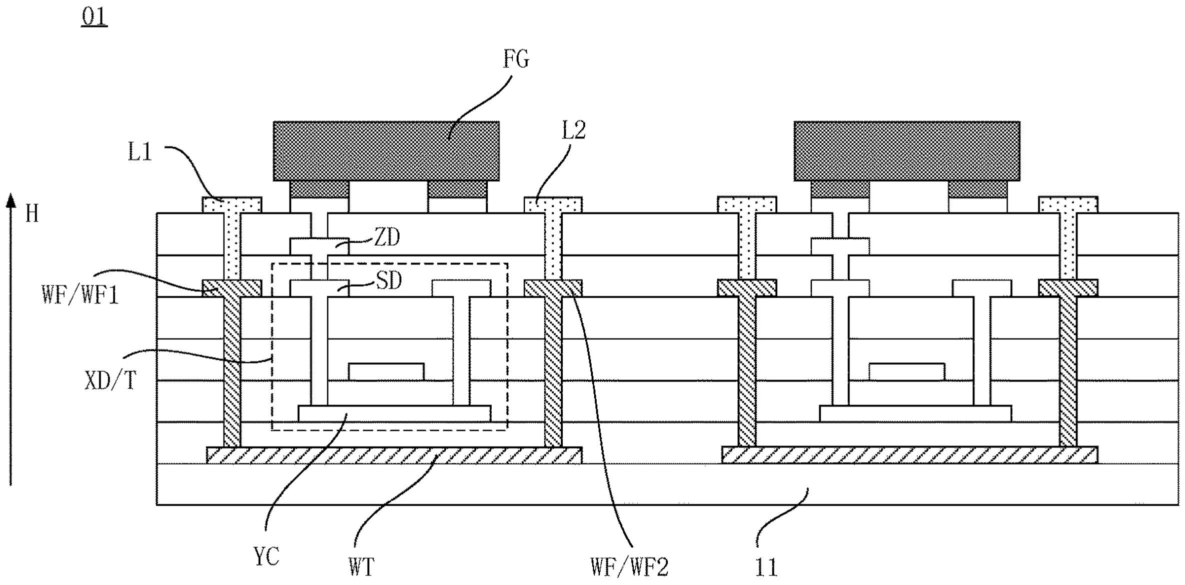
FIG. 3 is a structural schematic diagram of another display panel provided by an embodiment of the present application.

FIG. 3 is a structural schematic diagram of another display panel provided by an embodiment of the present application.

In an embodiment of the present application, as shown in FIG. 3, the display panel 01 further comprises auxiliary temperature detection structures WF connected to the temperature detection structure WT, the auxiliary temperature detection structures WF and the temperature detection structure WT are provided in different layers, and the auxiliary temperature detection structures WF may be connected to the temperature detection structure WT through via holes. The first connection electrode L1 and the second connection electrode L2 are connected to the temperature detection structure WT through the auxiliary temperature detection structures WF.

Optionally, the first connection electrode L1 and the second connection electrode L2 are located on a side of the auxiliary temperature detection structures WF away from the temperature detection structure WT.

Optionally, the auxiliary temperature detection structures WF are of a line type such as S type. Certainly, the auxiliary temperature detection structures WF may be alternatively of a block type.

In the embodiment of the present application, the first connection electrode L1 and the second connection electrode L2 are provided to be connected to the temperature detection structure WT through the auxiliary temperature detection structures WF, and thus the first connection electrode L1 and the second connection electrode L2 may be connected to the auxiliary temperature detection structures WF through via holes, and in turn connected to the temperature detection structure WT through via holes between the auxiliary temperature detection structures WF and the temperature detection structure WT, which is conducive to ensuring that the depths of the via holes between the first connection electrode L1 and the second connection electrode L2 and the auxiliary temperature detection structures WF are smaller, and the depths of the via holes between the auxiliary temperature detection structures WF and the temperature detection structure WT are smaller, and improving the reliability of connection between the first connection electrode L1 and the second connection electrode L2 and the temperature detection structure WT. In addition, the auxiliary temperature detection structures WF are connected in series between the first connection electrode L1 and the temperature detection structure WT and between the second connection electrode L2 and the temperature detection structure WT, so that the amount of variation with temperature is increased, thereby improving the detection precision.

In an implementation of the embodiment of the present application, still referring to FIG. 3, the auxiliary temperature detection structures WF comprise a first auxiliary temperature detection structure WF1 and a second auxiliary temperature detection structure WF2. The first connection electrode L1 is connected to the temperature detection structure WT through the first auxiliary temperature detection structure WF1, which is located between a film layer where the first connection electrode L1 is located and a film layer where the temperature detection structure WT is located. The second connection electrode L2 is connected to the temperature detection structure WT through the second auxiliary temperature detection structure WF2, which is located between a film layer where the second connection electrode L2 is located and the film layer where the temperature detection structure WT is located. The first auxiliary temperature detection structure WF1 and the second auxiliary temperature detection structure WF2 may be provided in a same layer, or may be provided in different layers.

In the present implementation, while ensuring reliability of connection between the first connection electrode L1 and the second connection electrode L2 and the temperature detection structure WT, the first auxiliary temperature detection structure WF1 and the second auxiliary temperature detection structure WF2 may be separated from each other, which is conducive to improving the diversity of providing positions of the first auxiliary temperature detection structure WF1 and the second auxiliary temperature detection structure WF2, and reducing the difficulty of providing the first auxiliary temperature detection structure WF1 and the second auxiliary temperature detection structure WF2.

Figure 4:
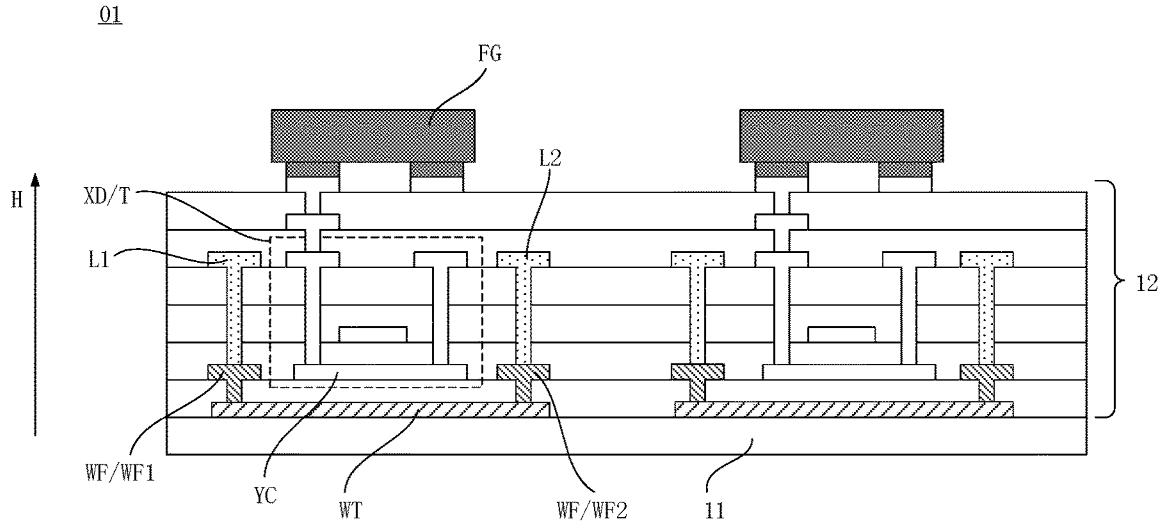
FIG. 4 is a structural schematic diagram of another display panel provided by an embodiment of the present application.

FIG. 4 is a structural schematic diagram of another display panel provided by an embodiment of the present application.

As shown in FIG. 4, in an embodiment of the present application, the display panel 01 further comprises a substrate 11, a drive circuit layer 12, and a light-emitting device FG. Wherein the substrate 11 may be a rigid substrate such as a glass substrate, or may be a flexible substrate such as a polyimide substrate (PI substrate). This is not specifically limited in the present application.

The drive circuit layer 12 is located on the substrate 11 and comprises a transistor T, which comprises an active layer YC. The active layer YC comprises a semiconductor material such as silicon (Si). The active layer YC may comprise at least one of an amorphous silicon layer and a low-temperature polysilicon layer. The active layer YC may alternatively comprise a metal oxide such as an indium gallium zinc oxide (IGZO).

The light-emitting device FG is located on the drive circuit layer 12, the transistor T in the drive circuit layer 12 may form a pixel circuit XD, which is configured for driving the light-emitting device FG to emit light.

The drive circuit layer 12 may comprise the temperature detection structure WT, the first connection electrode L1, the second connection electrode L2, and the auxiliary temperature detection structures WF. Wherein the temperature detection structure WT may be located between a film layer where the active layer YC is located and the substrate 11, and the auxiliary temperature detection structures WF and the active layer YC are provided in a same layer, that is, the auxiliary temperature detection structures WF and the active layer YC may be provided in a same layer and made of a same material. For example, both the auxiliary temperature detection structures WF and the active layer YC comprise a semiconductor material. The first connection electrode L1 and the second connection electrode L2 are located on a side of the film layer where the active layer YC is located that is away from the temperature detection structure WT.

Optionally, in a thickness direction H of the display panel 01, the temperature detection structure WT at least partially overlaps the active layer YC.

In the embodiment of the present application, the temperature detection structure WT is provided between the film layer where the active layer YC is located and the substrate 11, so that on one hand, because there are fewer wires between the film layer where the active layer YC is located and the substrate 11, the temperature detection structure WT can be located at more positions, which is conducive to improving a providing range of the temperature detection structure WT, and on the other hand, it is possible for the temperature detection structure WT to shield the light from the substrate 11 side from entering the active layer YC, which is conducive to reducing a leakage current of the transistor T, and thus improving the precision of the pixel circuit XD driving the light-emitting device FG to emit light.

It should be noted that in addition to the active layer YC, the drive circuit layer 12 further comprises a plurality of metal layers, such as a gate layer of the transistor T, a source/drain layer of the transistor T, a capacitor plate layer, a data line layer, and a power line layer. In addition to being located on the active layer YC, the auxiliary temperature detection structures WF may be located on another metal layer of the drive circuit layer 12, provided that the first connection electrode L1 and the second connection electrode L2 are located on a side of a film layer where the auxiliary temperature detection structures WF are located that is away from the temperature detection structure WT.

In an embodiment of the present application, a temperature coefficient of resistance of the first connection electrode L1 is less than a temperature coefficient of resistance of the temperature detection structure WT, and/or a temperature coefficient of resistance of the second connection electrode L2 is less than the temperature coefficient of resistance of the temperature detection structure WT.

It can be understood that the greater the temperature coefficient of resistance, the greater the relative variation in resistance value per unit temperature variation.

In the embodiment of the present application, the temperature coefficient of resistance of the first connection electrode L1 is set to be smaller, a proportion of a resistance value of the first connection electrode L1 in a total resistance value of the temperature detection structure WT, the first connection electrode L1, and the second connection electrode L2 as a whole can be reduced in a high-temperature environment, which is conducive to increasing the proportion of the resistance value of the temperature detection structure WT, and thus improving the precision of the temperature detection structure TW in temperature detection.

In another implementation, the first connection electrode L1 and the second connection electrode L2 may use a same material as the temperature detection structure WT, or the temperature coefficient of resistance of the first connection electrode L1 and the temperature coefficient of resistance of the second connection electrode L2 are greater than the temperature coefficient of resistance of the temperature detection structure WT. Therefore, at different temperatures, the sum of the variations in the resistance values of the first connection electrode L1, the second connection electrode L2, and the temperature detection structure WT together reflects the temperature variation at the position, thereby increasing the amount of the variation in resistance value at the same temperature difference, and improving measurement precision.

Still referring to FIG. 2, in an embodiment of the present application, the display panel 01 comprises a substrate 11, a drive circuit layer 12, and a light-emitting device FG. The substrate 11 may be a rigid substrate such as a glass substrate, or may be a flexible substrate such as a polyimide substrate (PI substrate). This is not specifically limited in the present application.

The drive circuit layer 12 is located on the substrate 11 and comprises a transistor T, which may be a thin film transistor. A plurality of transistors T may form a pixel circuit XD, which is configured for driving the light-emitting device FG to emit light.

The light-emitting device FG is located on the drive circuit layer 12, that is, the light-emitting device FG is located on a side of the drive circuit layer 12 away from the substrate 11. Some of the transistors T in the drive circuit layer 12 may be electrically connected to the light-emitting device FG to transmit a drive current generated by the pixel circuit XD to the light-emitting device FG.

The drive circuit layer 12 comprises the temperature detection structure WT, the first connection electrode L1, and the second connection electrode L2.

In the embodiment of the present application, the temperature detection structure WT, the first connection electrode L1, and the second connection electrode L2 are integrated into the drive circuit layer 12, and thus it is not necessary to increase the quantity of film layers of the display panel 01 for preparing the temperature detection structure WT, the first connection electrode L1, and the second connection electrode L2, which is conducive to achieving the temperature detection of the display panel 01 without excessively increasing the thickness of the display panel 01, and is conducive to achieving a lighter and thinner display panel 01.

Figure 5A:
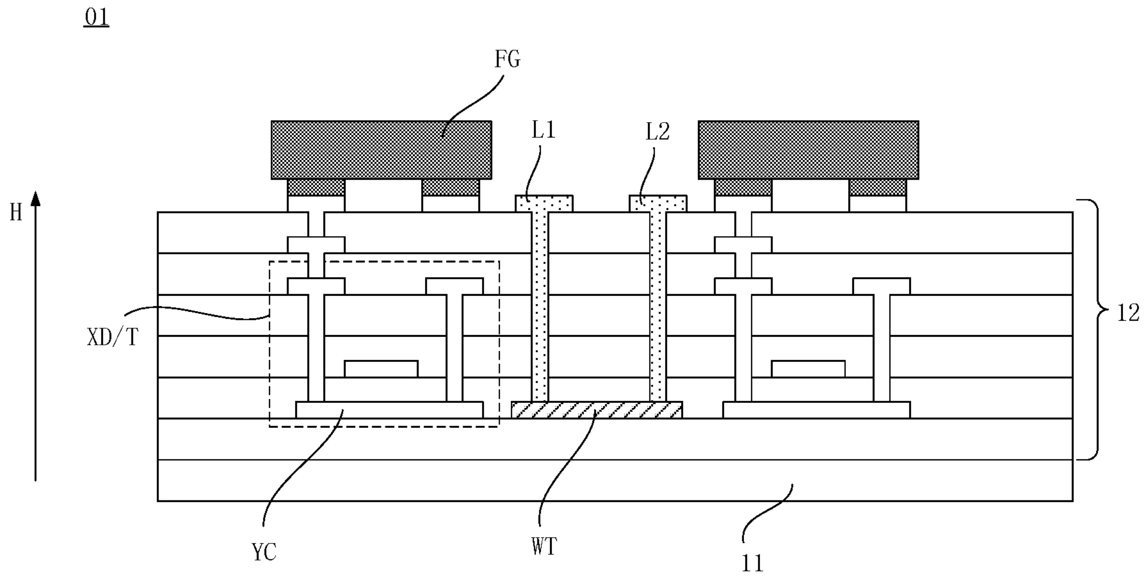
FIG. 5*a* is a structural schematic diagram of another display panel provided by an embodiment of the present application.
Figure 5B:
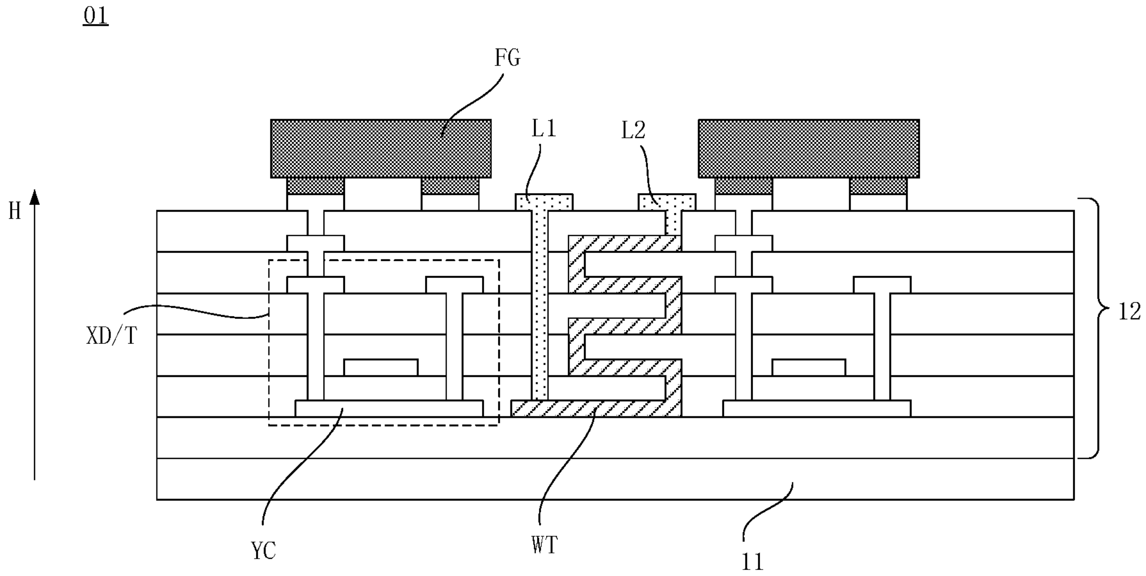
FIG. 5*b* is a structural schematic diagram of another display panel provided by an embodiment of the present application.

FIG. 5*a* is a structural schematic diagram of another display panel provided by an embodiment of the present application, and FIG. 5*b* is a structural schematic diagram of another display panel provided by an embodiment of the present application.

As a possible implementation, as shown in FIG. 2, the transistor T comprises an active layer YC, which may comprise a semiconductor material. The temperature detection structure WT is located between the film layer where the active layer YC is located and the substrate 11. Because there are fewer wires between the film layer where the active layer YC is located and the substrate 11, providing the temperature detection structure WT at this position is conducive to increasing the providing region of the temperature detection structure WT and reducing the difficulty of providing the temperature detection structure WT. In addition, because a plurality of transistors T may form a pixel circuit XD, providing the temperature detection structure WT between the film layer where the active layer YC is located and the substrate 11, that is, providing the temperature detection structure WT on a side of the pixel circuit XD facing toward the substrate 11, can also reduce the influence of the temperature detection structure WT on the operation of the pixel circuit XD, which is conducive to ensuring operating accuracy of the pixel circuit XD.

The temperature detection structure WT, the first connection electrode L1, and the second connection electrode L2 may all be insulated from the pixel circuit XD, that is, the temperature detection structure WT, the first connection electrode L1, and the second connection electrode L2 are not electrically connected to the pixel circuit XD so as not to affect the driving process of the pixel circuit XD.

In addition, as a possible implementation, the temperature detection structure WT may be alternatively located in a film layer where the transistor T is located, or may be located in a film layer on a side of the transistor T away from the substrate 11, that is, the temperature detection structure WT is no longer located between the film layer where the active layer YC is located and the substrate 11. For example, as shown in FIG. 5*a*, the temperature detection structure WT may be on a same layer as the active layer YC of the transistor T. Certainly, the temperature detection structure WT may be alternatively provided in a same layer as a gate or a source/drain of the transistor T. In this way, it is conducive to reducing the thickness of the display panel 01 and achieving a lighter and thinner display panel 01. As shown in FIG. 5*b*, the temperature detection structure WT may be a three-dimensional structure, and is distributed in a plurality of film layers of the display panel 01. In this way, on one hand, it is conducive to increasing a wire length of the temperature detection structure WT, and thus increasing a resistance value of the temperature detection structure WT, and on the other hand, it is conducive to reducing a plane area occupied by the temperature detection structure WT, and reducing the difficulty of providing the temperature detection structure WT.

Still referring to FIG. 2, in an embodiment of the present application, in a thickness direction H of the display panel 01, the temperature detection structure WT overlaps the active layer YC.

Optionally, as shown in FIG. 2, the temperature detection structure WT covers the active layer YC, and an edges of the temperature detection structure WT extend beyond an edge of the active layer YC. That is, in a thickness direction H of the display panel 01, a projected area of the temperature detection structure WT is greater than a projected area of the active layer YC.

Certainly, the temperature detection structure WT may partially overlap the active layer YC, or fully overlap the active layer YC (frontal projections of the two in the thickness direction of the display panel coincide).

It can be understood that the active layer YC of the transistor T may generate a leakage current when exposed to light, thereby affecting the normal display of the light-emitting device FG, thereby affecting the normal display of the light-emitting device FG.

In the embodiment of the present application, the temperature detection structure WT may be reused as a shielding layer, which can shield the light from the substrate 11 side from entering the active layer YC while implementing temperature detection, which is conducive to reducing a current leakage of the transistor T, and thus ensuring operating precision of the light-emitting device FG. The material of the temperature detection structure WT may comprise molybdenum, which may play a role in shading light while playing a role in temperature detection.

Figure 6A:
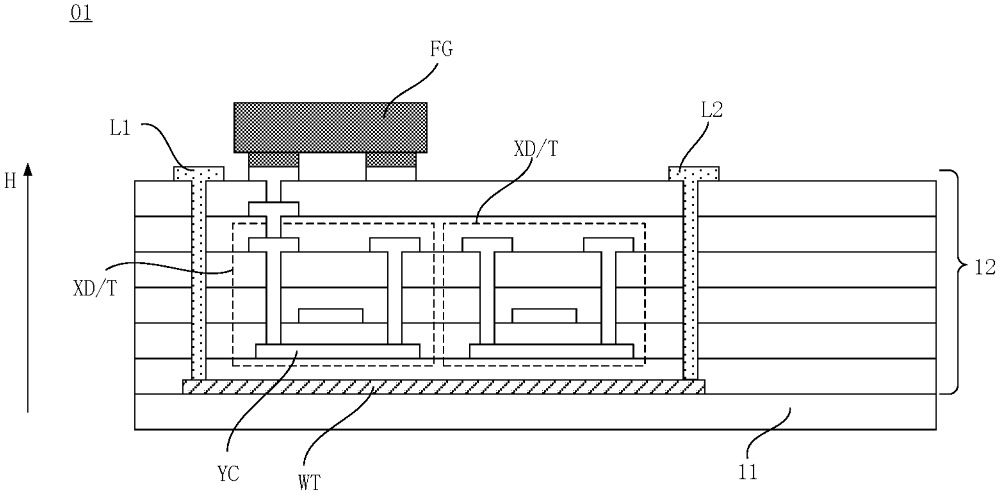
FIG. 6*a* is a structural schematic diagram of another display panel provided by an embodiment of the present application.
Figure 6B:
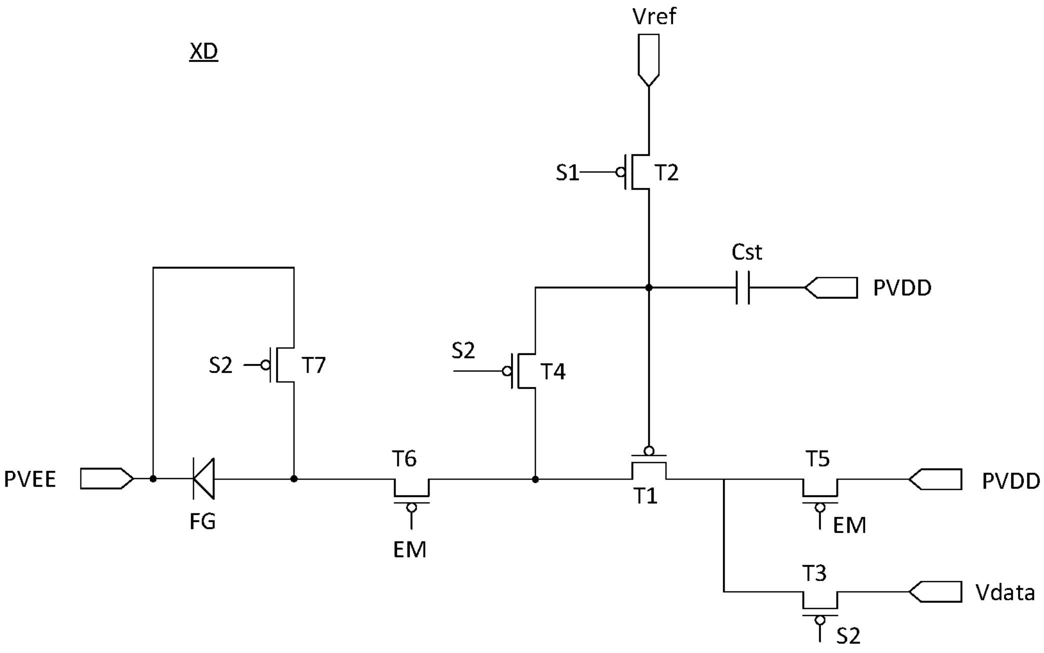
FIG. 6*b* is a schematic diagram of a pixel circuit related to the present application.

FIG. 6*a* is a structural schematic diagram of another display panel provided by an embodiment of the present application, and FIG. 6*b* is a schematic diagram of a pixel circuit related to the present application.

As shown in FIG. 6*a*, in an embodiment of the present application, the temperature detection structure WT overlaps active layers of at least two transistors T. It should be noted that FIG. 6*a* merely shows a case where the temperature detection structure WT overlaps active layers YC of two transistors T, and is not intended to limit the quantity of the active layers YC of the transistor T overlapping with the temperature sensing structure WT. The temperature detection structure WT may overlap active layers of three or more transistors T.

Further, a plurality of transistors T may form a pixel circuit XD that drives the light-emitting device FG. As shown in FIG. 6*b*, the pixel circuit XD may comprise transistors T1-T7 and a storage capacitor Cst, the connection manner of the transistors T1-T7 and the storage capacitor Cst is shown in FIG. 6*b* and details are not described herein. Wherein Vref is a reset voltage signal, Vdata is a data voltage signal, PVDD and PVEE are power voltage signals, S1 and S2 are scan signals received by the pixel circuit XD, and EM is a light-emitting control signal received by the pixel circuit XD. The temperature detection structure WT may overlap active layers of all the transistors T in a same pixel circuit XD. In addition, in a thickness direction H of the display panel 01, the temperature detection structure WT may also cover the entire pixel circuit XD.

In the embodiment of the present application, the provision of the temperature detection structure WT may further prevent external light from entering the active layer YC, which is conducive to further reducing a current leakage of each of the transistors T, and thus further ensuring operating precision of the light-emitting device FG.

Figure 7:
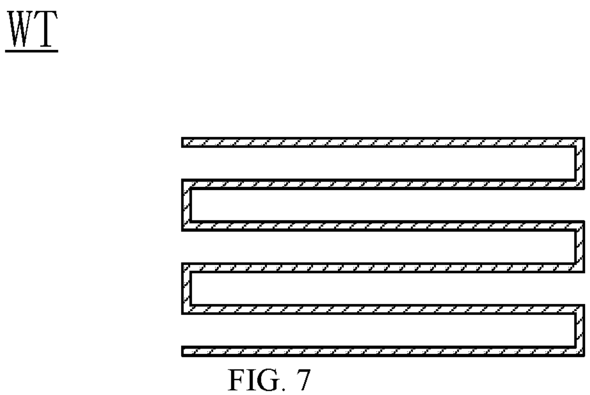
FIG. 7 is a plane schematic diagram of a temperature detection structure provided by an embodiment of the present application.
Figure 8:
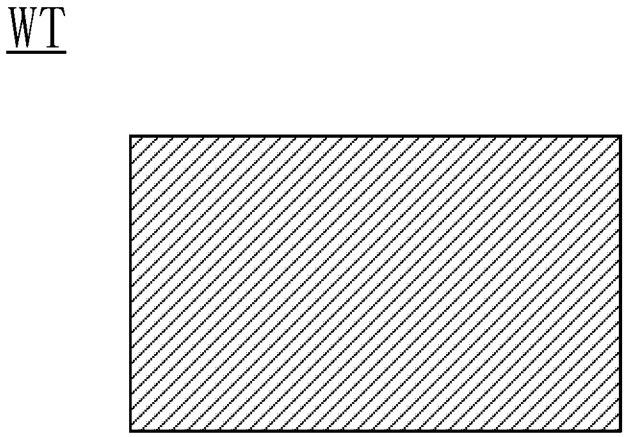
FIG. 8 is a plane schematic diagram of another temperature detection structure provided by an embodiment of the present application.
Figure 9:
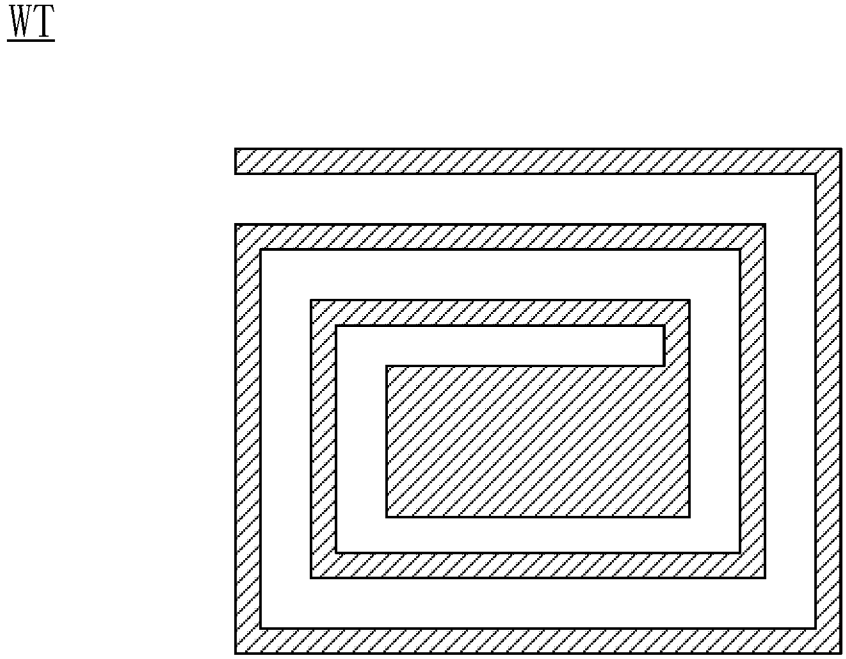
FIG. 9 is a plane schematic diagram of another temperature detection structure provided by an embodiment of the present application.

FIG. 7 is a plane schematic diagram of a temperature detection structure provided by an embodiment of the present application, FIG. 8 is a plane schematic diagram of another temperature detection structure provided by an embodiment of the present application, and FIG. 9 is a plane schematic diagram of another temperature detection structure provided by an embodiment of the present application.

In an embodiment of the present application, a shape of the temperature detection structure WT comprises at least one of a line type and a block type. That is, a shape of the temperature detection structure WT may be a line type, or may be a block type, or may be partially a line type and partially a block type.

For example, as shown in FIG. 7, a shape of the temperature detection structure WT is a line type. Optionally, a shape of the temperature detection structure WT may be an S type or a hollow square type. In addition, because the temperature detection structure WT may overlap the active layer YC of the transistor T, a shape of the temperature detection structure WT may be similar to a shape of the active layer YC overlapping the temperature detection structure WT.

For example, as shown in FIG. 8, a shape of the temperature detection structure WT is a block type. When the temperature detection structure WT overlaps the active layer YC of the transistor T, the temperature detection structure WT may cover the entire transistor T.

For example, as shown in FIG. 9, the temperature detection structure WT partially shaped as line type and partially shaped as block type. When the temperature detection structure WT is provided to overlap the active layer YC of the transistor T, the temperature detection structure WT may be provided in a shape of a line type in a region where the active layer YC is relatively dispersed, and the shape of the part of the temperature detection structure WT may be similar to a shape of the active layer YC overlapping the part of the temperature detection structure WT; and a shape of the temperature detection structure WT is provided in a shape of a block type in a region where the distribution of the active layer YC is concentrated, and the part of the temperature detection structure WT may fully shield the relatively concentrated active layer YC.

In the embodiment of the present application, when the temperature detection structure WT is of a line type, the resistance value of the temperature detection structure WT may be increased, which is conducive to improving the precision of the temperature detection structure TW in temperature detection. When the temperature detection structure WT is of a block type, it is conducive to improving the shading capability of the temperature detection structure WT. A shape of the temperature detection structure WT is diversified, so that the structural diversity of the display panel 01 can be improved, and it is conducive to improving the flexibility of provision of the temperature detection structure WT, to meet different design requirements of the display panel 01.

Figure 10:
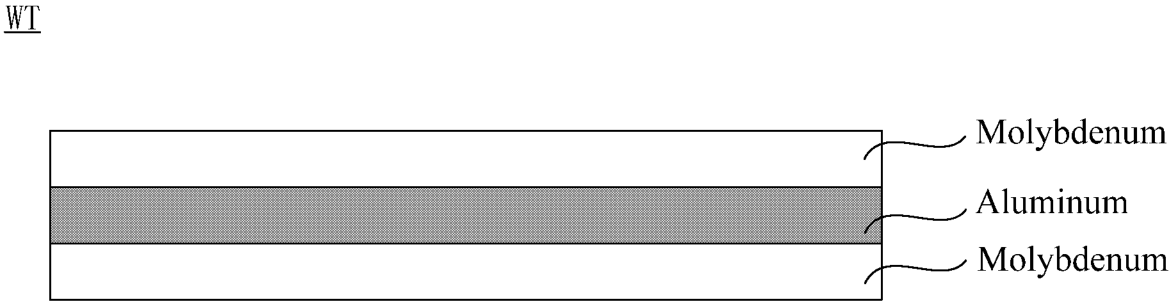
FIG. 10 is a structural schematic diagram of a temperature detection structure provided by an embodiment of the present application.

FIG. 10 is a structural schematic diagram of a temperature detection structure provided by an embodiment of the present application.

In an embodiment of the present application, as shown in FIG. 2 and FIG. 10, the temperature detection structure WT is a single-layer structure. Here, the single-layer structure means that the temperature detection structure WT does not comprise an insulation layer, and the temperature detection structure WT may be a one-layer conductive structure, or may be a laminated conductive structure.

For example, as shown in FIG. 2, the temperature detection structure WT may be a single-layer metal structure such as a single-layer structure of molybdenum. Alternatively, as shown in FIG. 10, the temperature detection structure WT is a laminated structure comprising molybdenum/aluminum/molybdenum. Certainly, the temperature detection structure WT may be alternatively a laminated structure comprising titanium/aluminum/titanium. Further, in addition to a metal material, the temperature detection structure WT may comprise another type of conductive material, for example, a semiconductor material such as silicon.

In the embodiment of the present application, the temperature detection structure WT is set to a single-layer structure, which is conducive to reducing the complexity of the temperature detection structure WT, and in turn reducing the difficulty of preparing the temperature detection structure WT.

Figure 11:
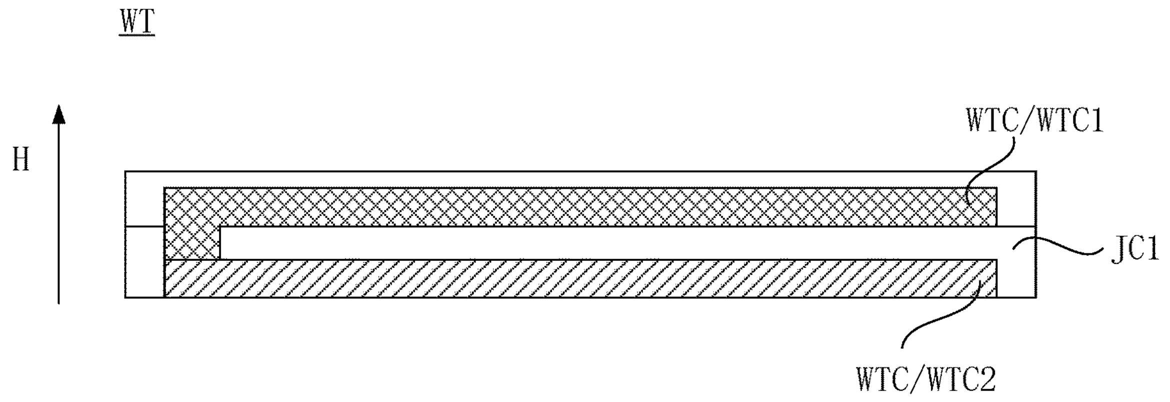
FIG. 11 is a structural schematic diagram of another temperature detection structure provided by an embodiment of the present application.

FIG. 11 is a structural schematic diagram of another temperature detection structure provided by an embodiment of the present application.

As shown in FIG. 11, in an embodiment of the present application, the temperature detection structure WT comprises at least two temperature detection layers WTC and at least one first insulation layer JC1 located between two adjacent temperature detection layers WTC. That is, the temperature detection structure WT may be a multi-layer structure, and an insulation layer is comprised between adjacent temperature detection layers WTC.

It should be noted that FIG. 11 merely shows a case where the temperature detection structure WT comprises two temperature detection layers WTC and one first insulation layer JC1.

Further, as shown in FIG. 11, the temperature detection structure WT comprises a first temperature detection layer WTC1 and a second temperature detection layer WTC2. Shapes of both the first temperature detection layer WTC1 and the second temperature detection layer WTC2 may be a line type or a block type, or one is a line type, and the other is a block type.

Optionally, in a thickness direction H of the display panel 01, the first temperature detection layer WTC1 at least partially overlaps the second temperature detection layer WTC2. In this way, it is conducive to improving a shading function of the temperature detection structure WT, thereby facilitating further reduction of a current leakage of the transistor T.

Optionally, when the shapes of the first temperature detection layer WTC1 and the second temperature detection layer WTC2 both are line type, the first temperature detection layer WTC1 and the second temperature detection layer WTC2 may be provided alternately. In this way, it is conducive to reducing a shading area of the temperature detection structure WT, and thus further reducing a current leakage in the pixel circuit and improving the operating precision of the light-emitting device FG.

Still referring to FIG. 11, in an embodiment of the present application, the two adjacent temperature detection layers WTC are connected in series. Optionally, the two adjacent temperature detection layers WTC may be connected through a via hole.

In the embodiment of the present application, the temperature detection structure WT comprises at least two temperature detection layers WTC and at least one first insulation layer JC, and two adjacent temperature detection layers WTC are connected in series, so that the resistance value of the temperature detection structure WT can be increased, which is conducive to increasing a proportion of a resistance value of the temperature detection structure WT in a resistance value of the temperature detection structure WT, the first connection electrode L1, and the second connection electrode L2 as a whole, and thus further increasing the precision of the temperature detection structure TW in temperature detection.

In an embodiment of the present application, still referring to FIG. 2, in the display panel 01, the drive circuit layer 12 further comprises a second insulation layer JC2 which is located between the temperature detection structure WT and the film layer where the active layer YC is located. The second insulation layer JC2 may be a single-layer structure, or may be a multi-layer structure. That is, one or more insulation layers may be comprised between the temperature detection structure WT and the film layer where the active layer YC is located.

Optionally, the second insulation layer JC2 comprises at least one of a first silicon oxide layer, a silicon nitride layer, and a second silicon oxide layer. When the second insulation layer JC2 comprises the first silicon oxide layer, the silicon nitride layer, and the second silicon oxide layer, the silicon nitride layer may be located between the first silicon oxide layer and the second silicon oxide layer.

In a direction H perpendicular to a plane of the substrate 11, that is, in a thickness direction H of the display panel 01, a distance between the temperature detection structure WT and the film layer where the active layer YC is located is H1, wherein 0.2 μm≤H1≤5 μm.

Optionally, when the second insulation layer JC2 is a single-layer structure, H1 may be 0.2 μm, 0.3 μm, 0.419 μm, 0.473 μm, or the like.

Optionally, when the second insulation layer JC2 is a multi-layer structure, H1 may be 0.454 μm, 0.5 μm, 0.892 μm, 0.927 μm, or the like.

In addition, H1 may be alternatively set to 3 μm, 4 μm, or the like, to meet a requirement for a distance between the temperature detection structure WT and the active layer YC.

In the embodiment of the present application, a distance between the temperature detection structure WT and the film layer where the active layer YC is located is set within a preset range, which, on one hand, may avoid that a distance between the temperature detection structure WT and the light-emitting device FG is too large, which affects the precision in detecting the temperature at a position where the light-emitting device FG is located, and on the other hand, can minimize the parasitic capacitance between the temperature detection structure WT and the transistor T, thereby reducing the influence of the temperature detection structure WT on the operation of the transistor T.

Figure 12:
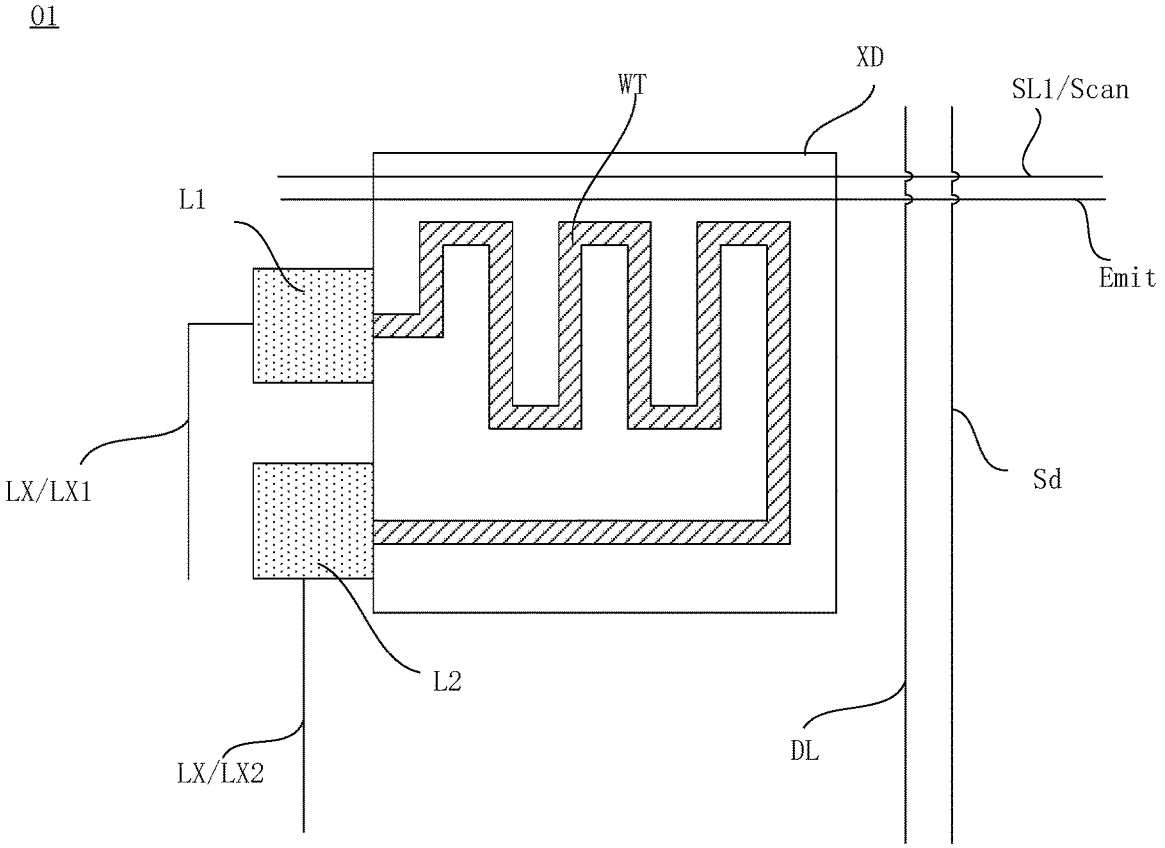
FIG. 12 is a partial plane schematic diagram of a display panel provided by an embodiment of the present application.
Figure 13:
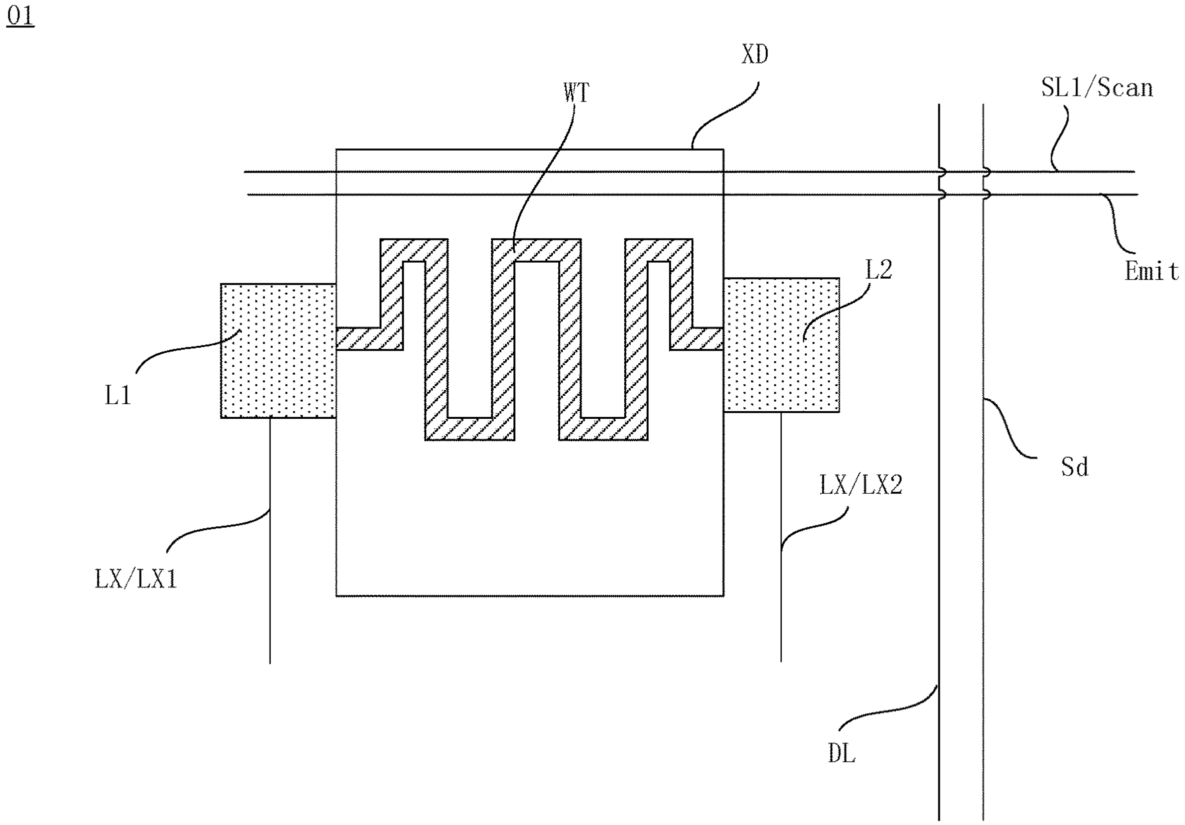
FIG. 13 is a partial plane schematic diagram of another display panel provided by an embodiment of the present application.
Figure 14:
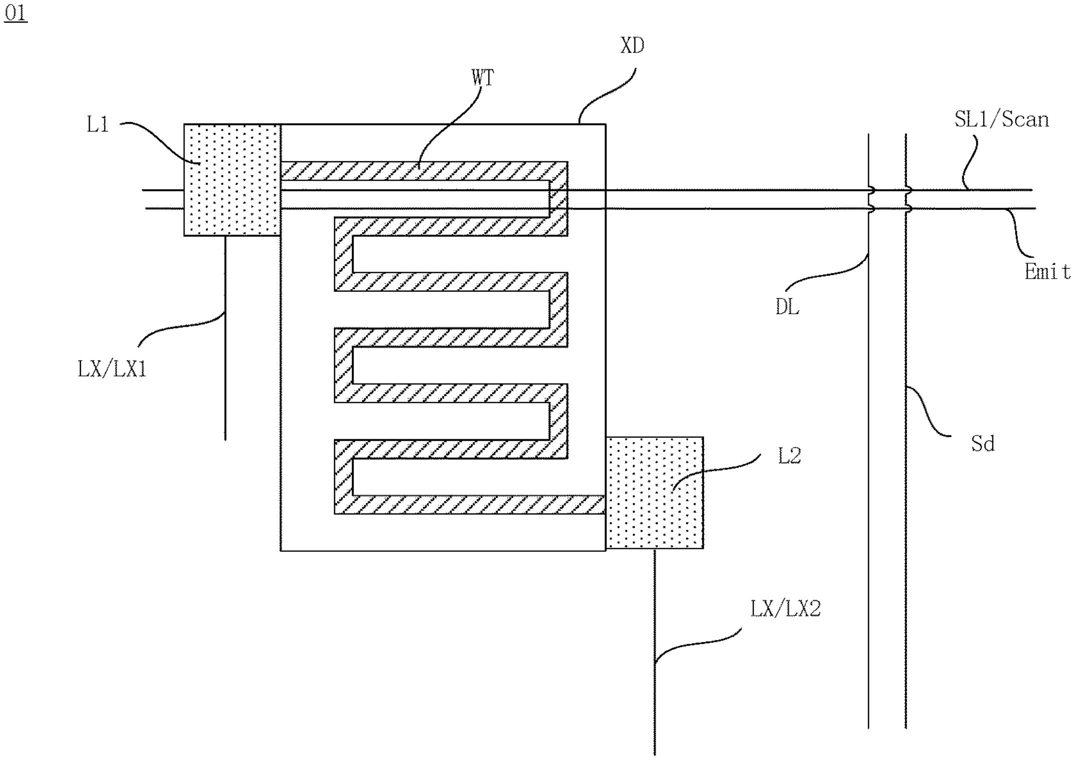
FIG. 14 is a partial plane schematic diagram of another display panel provided by an embodiment of the present application.

FIG. 12 is a partial plane schematic diagram of a display panel provided by an embodiment of the present application, FIG. 13 is a partial plane schematic diagram of another display panel provided by an embodiment of the present application, and FIG. 14 is a partial plane schematic diagram of another display panel provided by an embodiment of the present application.

Still referring to FIG. 2, in an embodiment of the present application, the first connection electrode L1 is located on a side of the film layer where the active layer YC is located that is away from the temperature detection structure WT, and the first connection electrode L1 is connected to the temperature detection structure WT through a first via hole K1. The second connection electrode L2 is located on a side of the film layer where the active layer YC is located that is away from the temperature detection structure WT, and the second connection electrode L2 is connected to the temperature detection structure WT through a second via hole K2.

Optionally, the first connection electrode L1 and the second connection electrode L2 are prepared in a same layer. In this way, it is possible to facilitate the simplification of a preparation process. Certainly, the first connection electrode L1 and the second connection electrode L2 may be alternatively provided in different layers to meet different user requirements.

Further, with reference to FIG. 12 to FIG. 14, the drive circuit layer 12 further comprises a first signal line SL1 and a pixel circuit XD. The pixel circuit XD is configured for driving a light-emitting device FG, and the pixel circuit XD comprises a transistor T. The first signal line SL1 is configured for providing a signal for the pixel circuit XD. The first signal line SL1 may be a scan line Scan or a light-emitting control signal line Emit that transmits a control signal to the transistor T in the pixel circuit XD, or may be a data line DL that provides a data voltage signal or a power line Sd that provides a power voltage signal to the pixel circuit XD.

Wherein with reference to FIG. 6*b*, the scan line Scan may be configured for transmitting scan signals S1 and S2, and the light-emitting control signal line Emit may be configured for transmitting a light-emitting control signal EM. The data line DL may be configured for transmitting a data voltage signal Vdata, and the power line Sd may be configured for transmitting a power voltage signal PVDD or PVEE. The scan line Scan and the light-emitting control signal line Emit may extend in a row direction of the display panel, and the data line DL and the power line Sd may extend in a column direction of the display panel. That is, the first signal line SL1 may extend in the row direction or the column direction of the display panel 01.

It should be noted that, in FIG. 12 to FIG. 14, the light-emitting device FG is not illustrated, but only the position relationship between the pixel circuit XD (the layout region of the pixel circuit XD is shown with a block diagram), the temperature detection structure WT, the first connection electrode L1, the second connection electrode L2, and the first signal line SL1 is illustrated, and the first signal line SL1 is a scan line Scan. A plurality of pixel circuits XD arranged in the row direction may be connected to the same scan line Scan and/or the same light-emitting control signal line Emit, and a plurality of pixel circuits XD arranged in the column direction may be connected to the same data line DL and/or the same power line Sd.

As shown in FIG. 12, in an extension direction of the first signal line SL1, the first connection electrode L1 and the second connection electrode L2 are located on a same side of the pixel circuit XD. Alternatively, as shown in FIG. 13 and FIG. 14, in an extension direction of the first signal line SL1, the first connection electrode L1 and the second connection electrode L2 are located on opposite sides of the pixel circuit XD.

It should be noted that, regardless of whether the first connection electrode L1 and the second connection electrode L2 are located on opposite sides or a same side of the pixel circuit XD, the temperature detection structure WT may overlap the transistor T in the pixel circuit XD, and even cover the entire pixel circuit XD.

It can be understood that a signal wire is further provided in the display panel 01 to be connected to the first connection electrode L1 and the second connection electrode L2, so as to provide a detection signal to the temperature detection structure WT through the first connection electrode L1 and the second connection electrode L2.

In the embodiment of the present application, it is possible to flexibly set the positions of the first connection electrode L1 and the second connection electrode L2 relative to the pixel circuit XD, which is conducive to achieving the provision of detection signals to the temperature detection structure WT at different positions, and thus flexibly adjusting, according to the layout needs of the display panel 01, the position of a signal wire that provides a detection signal to the temperature detection structure WT, and in turn improving the design flexibility of the display panel 01.

Figure 15:
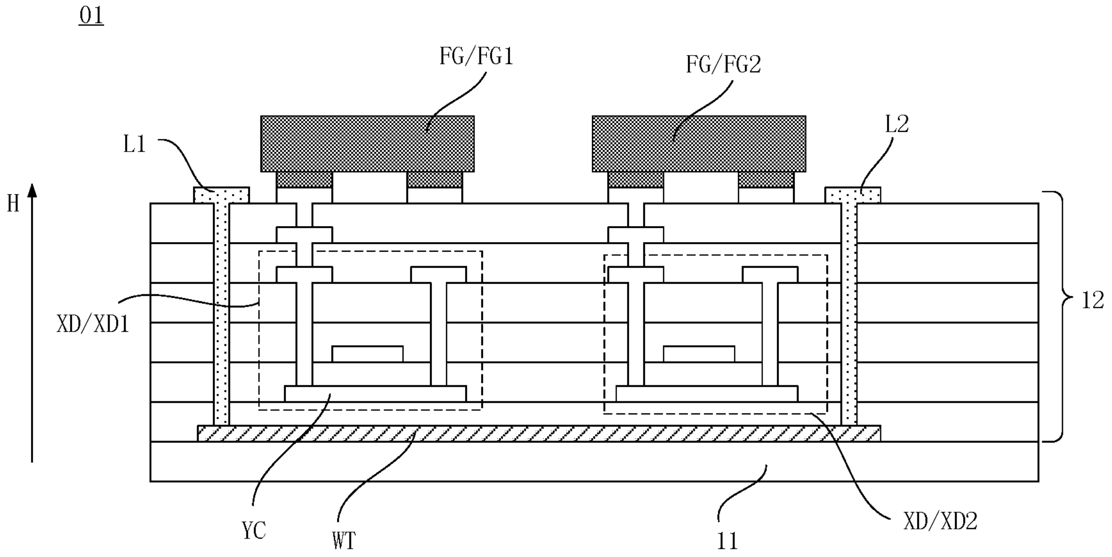
FIG. 15 is a structural schematic diagram of another display panel provided by an embodiment of the present application.
Figure 16:
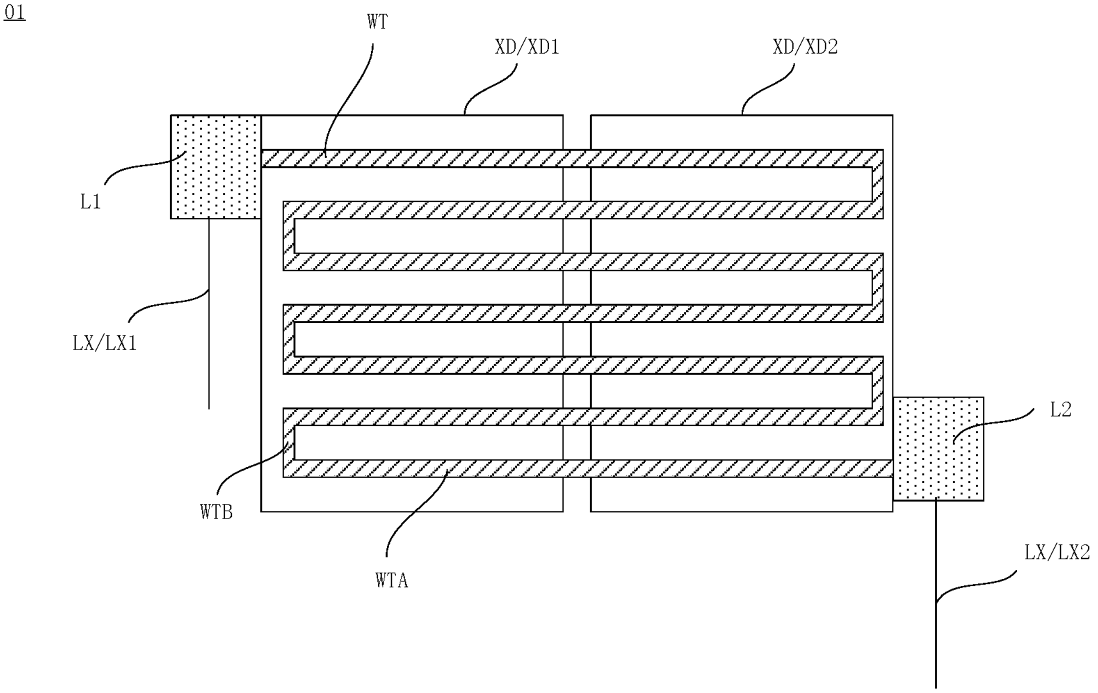
FIG. 16 is a partial plane schematic diagram of another display panel provided by an embodiment of the present application.
Figure 17:
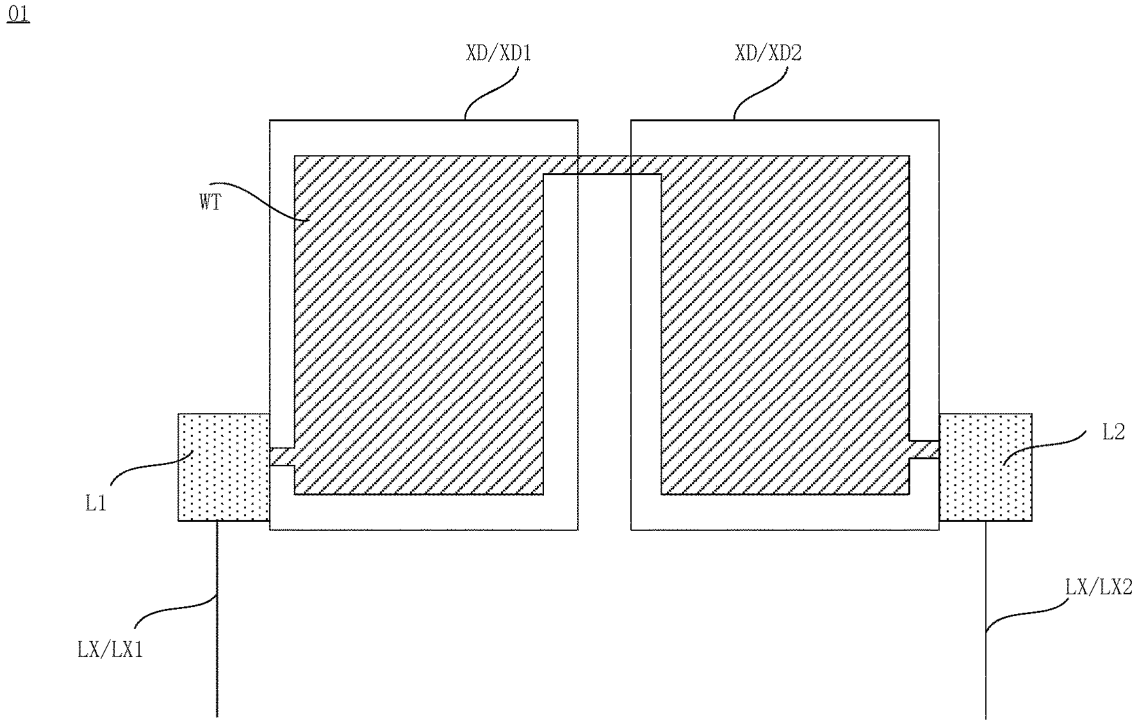
FIG. 17 is a partial plane schematic diagram of another display panel provided by an embodiment of the present application.

FIG. 15 is a structural schematic diagram of another display panel provided by an embodiment of the present application, FIG. 16 is a partial plane schematic diagram of another display panel provided by an embodiment of the present application; and FIG. 17 is a partial plane schematic diagram of another display panel provided by an embodiment of the present application.

In an embodiment of the present application, as shown in FIG. 15, the drive circuit layer 12 comprises a plurality of pixel circuits XD, which are configured for driving the light-emitting devices FG to emit light, and a pixel circuit XD comprises a transistor T. As shown in FIG. 6*b*, a same pixel circuit XD may comprise a plurality of transistors T, and a same pixel circuit XD may be configured for driving one light-emitting device FG. Certainly, in some cases, one pixel circuit XD may be alternatively configured for driving a plurality of light-emitting devices FG.

With reference to FIG. 16 and FIG. 17, the temperature detection structure WT overlaps at least two pixel circuits XD. Certainly, the temperature detection structure WT may partially overlap with at least two pixel circuits XD, or may cover at least two pixel circuits XD.

It should be noted that FIG. 1 to FIG. 5 and FIG. 15 merely illustrate one transistor T in the pixel circuit XD. In an actual structure of the display panel 01, with reference to FIG. 6*b*, the temperature detection structure WT may overlap any one of the transistors T1-T7 in the pixel circuit XD, or may overlap at least one of the transistors T1-T7. When it is described that the temperature detection structure WT covers the pixel circuit XD, a case where the temperature detection structure overlaps a plurality of transistors in the pixel circuit XD or a case where the temperature detection structure WT covers the transistors T1-T7 in the pixel circuit XD is involved.

In FIG. 16 and FIG. 17, only a case where the first connection electrode L1 and the second connection electrode L2 are located on opposite sides of the pixel circuit XD is illustrated. In addition, the first connection electrode L1 and the second connection electrode L2 may be alternatively located on a same side of the pixel circuit XD.

In the embodiment of the present application, the length of the temperature detection structure WT may be larger, which is conducive to increasing the resistance value of the temperature detection structure WT, and thus increasing a proportion of a resistance value of the temperature detection structure WT in a total resistance value of the temperature detection structure WT, the first connection electrode L1, and the second connection electrode L2 as a whole, and in turn improving the precision of the temperature detection structure TW in temperature detection.

It should be noted that, as shown in FIG. 16, the temperature detection structure WT may be of a line type. Certainly, the temperature detection structure WT may be alternatively of a block type, and one temperature detection structure WT of a block type overlaps a plurality of pixel circuits XD. As shown in FIG. 17, it may also be provided that a portion of the temperature detection structure WT overlapping the pixel circuit XD may be of a block type, and adjacent block types are connected to each other through a portion of a line type. That is, the temperature detection structure WT comprises both a portion of a block type and a portion of a line type.

Figure 18:
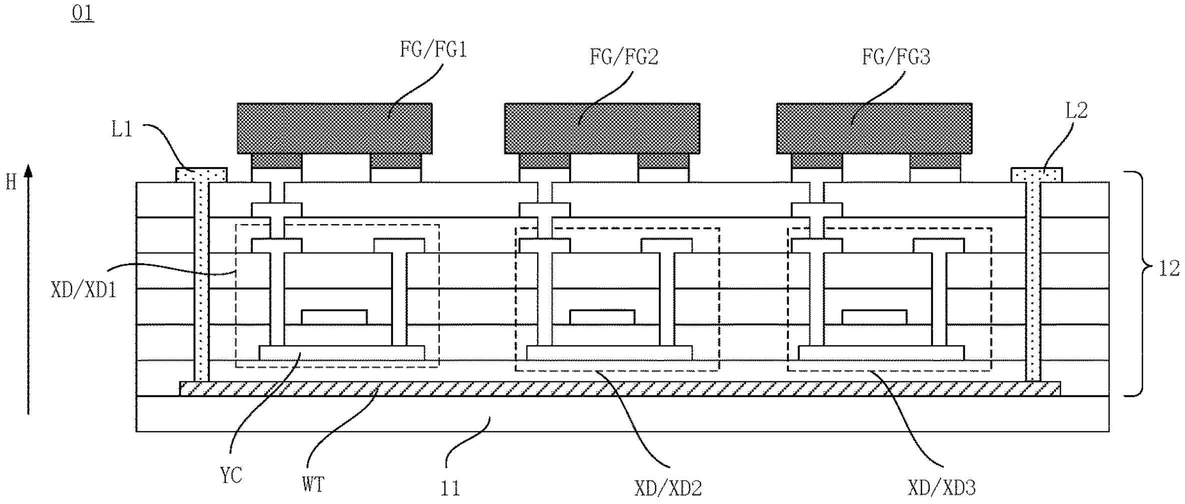
FIG. 18 is a structural schematic diagram of another display panel provided by an embodiment of the present application.
Figure 19:
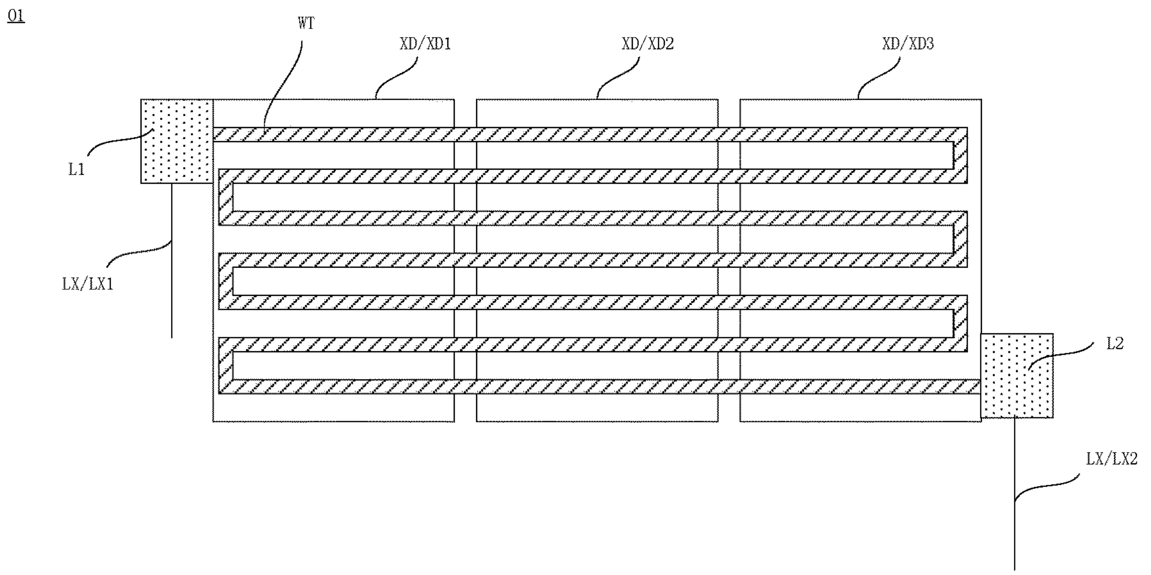
FIG. 19 is a partial plane schematic diagram of another display panel provided by an embodiment of the present application.

FIG. 18 is a structural schematic diagram of another display panel provided by an embodiment of the present application, and FIG. 19 is a partial plane schematic diagram of another display panel provided by an embodiment of the present application.

With reference to FIG. 15, FIG. 16, and FIG. 17 again, in an embodiment of the present application, the pixel circuits XD comprises a first pixel circuit XD1 and a second pixel circuit XD2, the light-emitting devices FG comprises a first light-emitting device FG1 and a second light-emitting device FG2 that have different light-emitting colors, the first pixel circuit XD1 is configured for driving the first light-emitting device FG1 to emit light, and the second pixel circuit XD2 is configured for driving the second light-emitting device FG2 to emit light. In a thickness direction H of the display panel 01, the temperature detection structure WT overlaps both the first pixel circuit XD1 and the second pixel circuit XD2.

It can be learned from the foregoing analysis that the temperature detection structure WT overlaps both the first pixel circuit XD1 and the second pixel circuit XD2, so that the temperature detection structure WT can be configured for detecting the temperatures at the positions where the first light-emitting device FG1 and the second light-emitting device FG2 are located. In the embodiment of the present application, the temperatures at the positions where the two light-emitting devices FG with different light-emitting colors are located may be detected at the same time, and in turn the color luminance of the first light-emitting device FG1 and the second light-emitting device FG2 may be adaptively compensated, which is conducive to reducing the quantity of the temperature detection structures WT required in the display panel 01, reducing the wiring complexity in the display panel 01 and the difficulty of preparing the display panel 01.

Further, with reference to FIG. 18 and FIG. 19, the pixel circuits XD further comprises a third pixel circuit XD3, the light-emitting devices FG comprises a third light-emitting device FG3, which is configured for driving the third light-emitting device FG3, and the light-emitting color of the third light-emitting device FG3 is different from that of the first light-emitting device FG1 and that of the second light-emitting device FG2.

Optionally, the first light-emitting device FG1 is a light-emitting device that emits red light, the second light-emitting device FG2 is a light-emitting device that emits green light, and the third light-emitting device FG3 is a light-emitting device that emits blue light.

The temperature detection structure WT overlaps all the first pixel circuit XD1, the second pixel circuit XD2, and the third pixel circuit XD3. That is, a same temperature detection structure WT may detect the temperatures at the positions where the first light-emitting device FG1, the second light-emitting device FG2, and the third light-emitting device FG3 are located. This is conducive to further reducing the quantity of the temperature detection structures WT required in the display panel 01, and reducing the wiring complexity in the display panel 01.

In addition, the first light-emitting device FG1, the second light-emitting device FG2, and the third light-emitting device FG3 that have different light-emitting colors may form a pixel unit, which is conducive to performing targeted color luminance compensation for the pixel units in different regions of the display panel 01, and achieving the display uniformity of the display panel 01.

Figure 20:
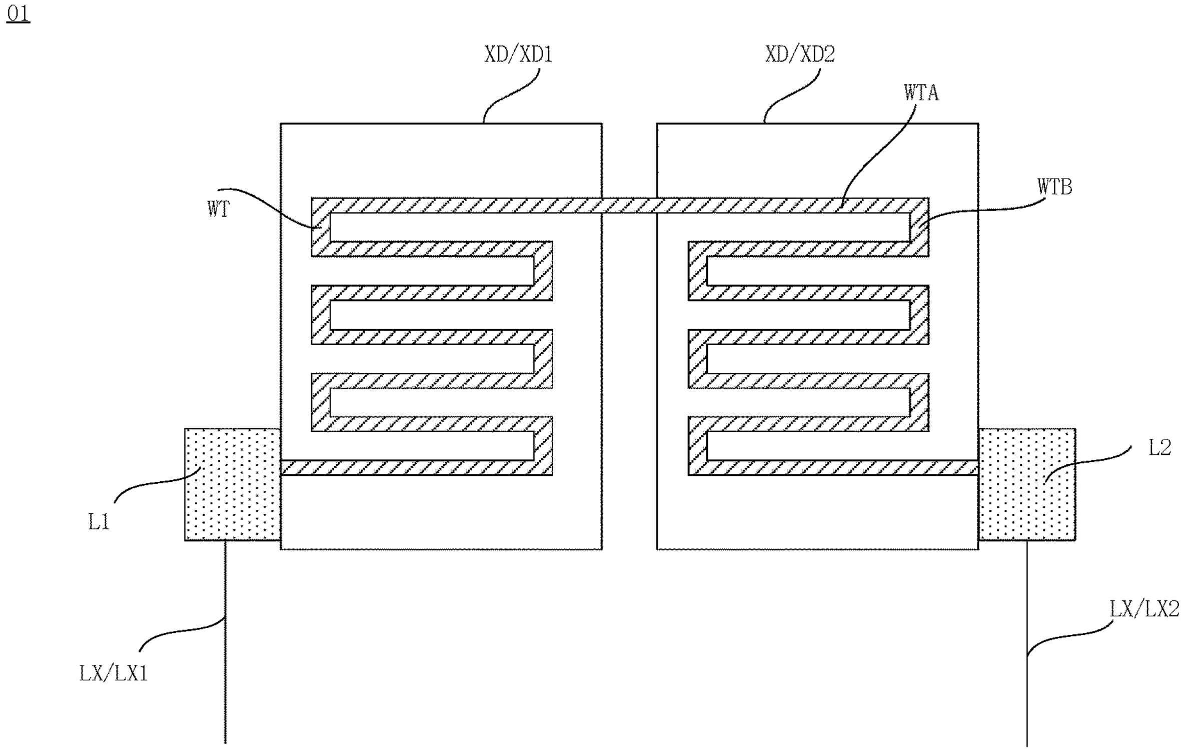
FIG. 20 is a partial plane schematic diagram of another display panel provided by an embodiment of the present application.

FIG. 20 is a partial plane schematic diagram of another display panel provided by an embodiment of the present application.

In an embodiment of the present application, as shown in FIG. 16, the temperature detection structure WT is S-shaped, the temperature detection structure WT comprises a plurality of long-segment structures WTA and a plurality of short-segment structures WTB, a short-segment structure WTB is connected between two long-segment structures WTA, and the length of the long-segment structure WTA is greater than the length of the short-segment structure WT.

Wherein at least one of the long-segment structures WTA overlaps two pixel circuits XD. The extension direction of the long-segment structure WTA may be the same as the arrangement direction of the two pixel circuits XD overlapping the long-segment structure WTA, and the extension direction of the short-segment structure WTB may intersect the extension direction of the long-segment structure WTA.

Optionally, as shown in FIG. 16, a plurality of long-segment structures WTA in the temperature detection structure WT overlap two pixel circuits XD.

Optionally, as shown in FIG. 20, one long-segment structure WTA in the temperature detection structure WT overlaps two pixel circuits XD, and the two portions connected to the long-segment structure WTA each overlap two pixel circuits XD.

In the embodiment of the present application, the temperature detection structure WT is S-shaped and overlaps two pixel circuits XD, so that the temperature detection structure WT has a larger length, which is conducive to ensuring a larger resistance value of the temperature detection structure WT, and in turn ensuring the precision of the temperature detected by the temperature detection structure TW during a temperature detection process.

Figure 21:
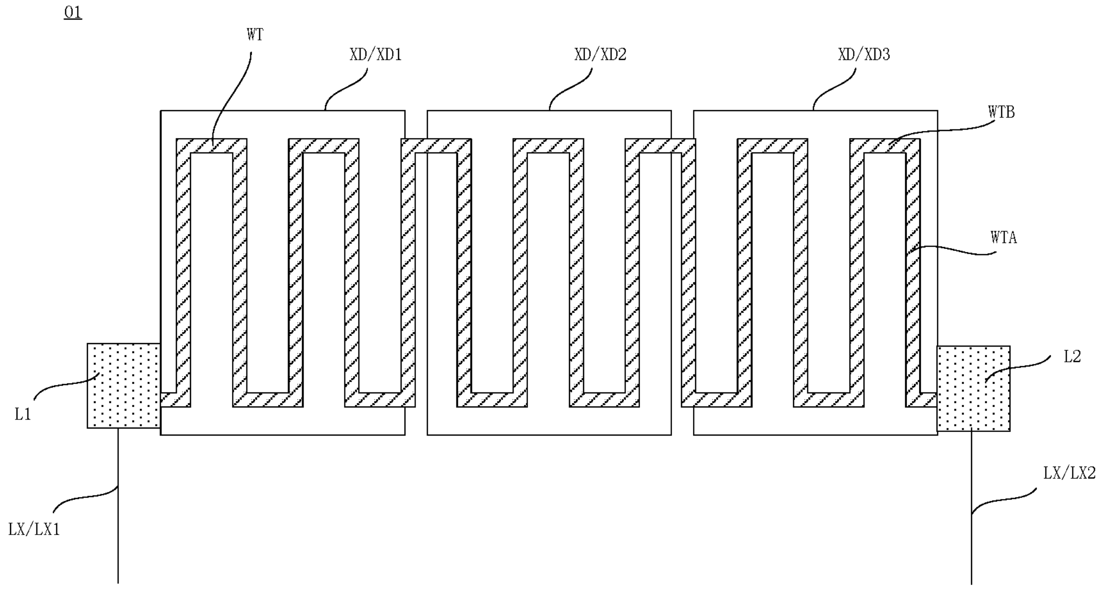
FIG. 21 is a partial plane schematic diagram of another display panel provided by an embodiment of the present application.

FIG. 21 is a partial plane schematic diagram of another display panel provided by an embodiment of the present application.

In addition, as shown in FIG. 21, the extension direction of the long-segment structures WTA in the temperature detection structure WT may be set to intersect the arrangement direction of a plurality of pixel circuits XD overlapping the temperature detection structure WT. The temperature detection structure WT is S-shaped and overlaps the plurality of pixel circuits XD.

Figure 22:
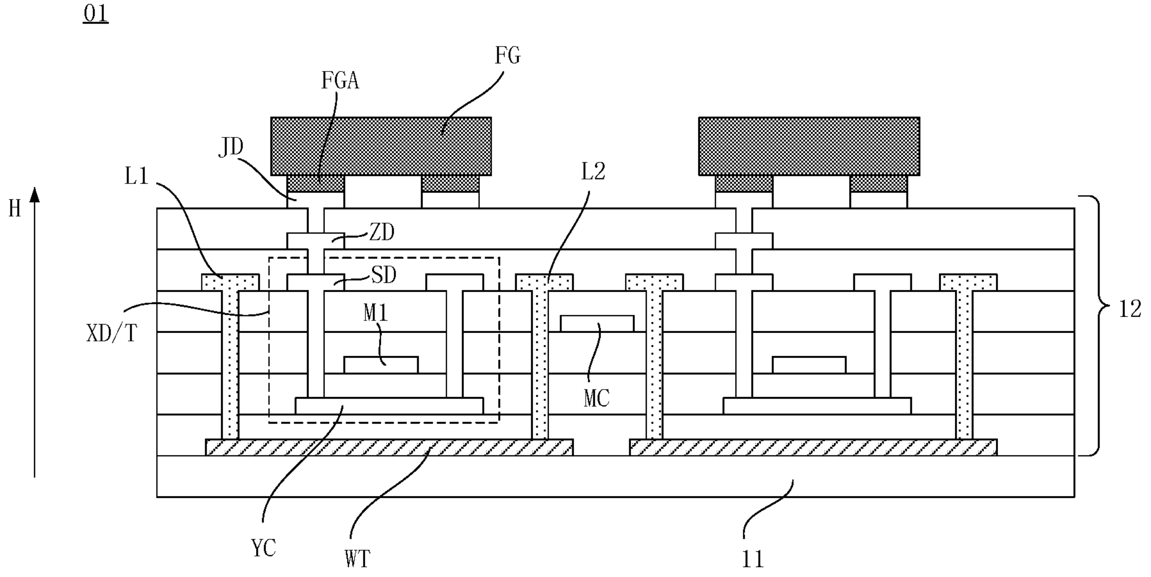
FIG. 22 is a structural schematic diagram of another display panel provided by an embodiment of the present application.

FIG. 22 is a structural schematic diagram of another display panel provided by an embodiment of the present application.

In an embodiment of the present application, as shown in FIG. 2 and FIG. 22, the drive circuit layer 12 comprises a contact electrode JD, the light-emitting device FG comprises an electrode FGA connected to the contact electrode JD, and the contact electrode JD may transmit a drive signal output by the pixel circuit XD to the light-emitting device FG.

As shown in FIG. 2, both the first connection electrode L1 and the second connection electrode L2 are provided in a same layer as the contact electrode JD, that is, the first connection electrode L1, the second connection electrode L2, and the contact electrode JD may be prepared by using a same material and a same process.

Alternatively, as shown in FIG. 22, the transistor T comprises a first electrode SD, which is connected to the active layer YC through a contact via hole, and the first electrode SD may be the source or the drain of the transistor T. Both the first connection electrode L1 and the second connection electrode L2 are provided in a same layer as the first electrode SD, that is, the first connection electrode L1, the second connection electrode L2, and the first electrode SD of the transistor T may be prepared by using a same material and a same process.

Optionally, both the first connection electrode L1 and the second connection electrode L2 comprise a titanium/aluminum/titanium laminated structure.

Figure 23:
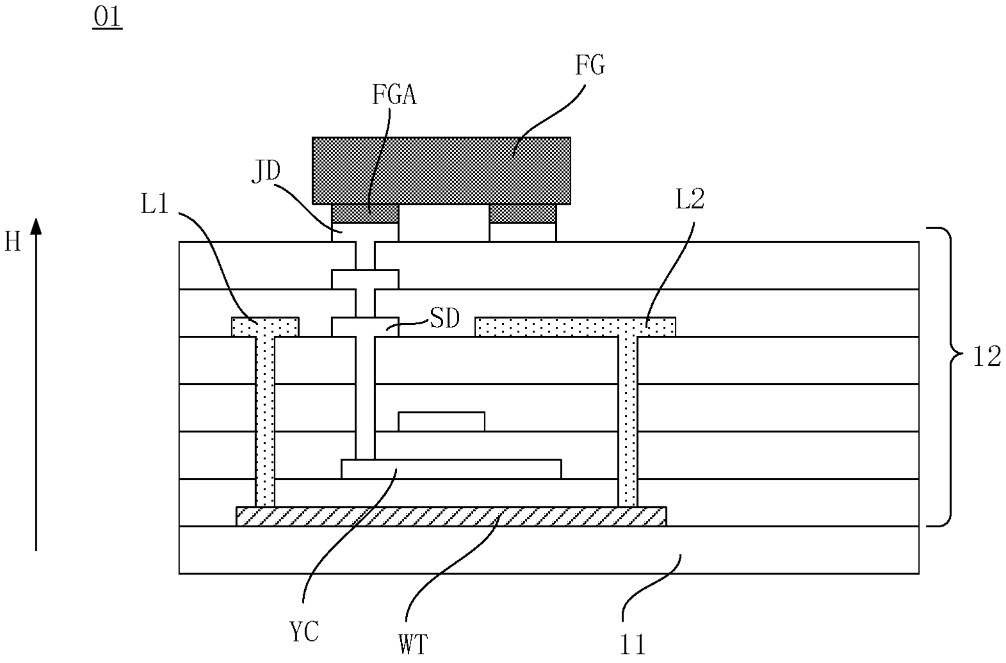
FIG. 23 is a structural schematic diagram of another display panel provided by an embodiment of the present application.

FIG. 23 is a structural schematic diagram of another display panel provided by an embodiment of the present application.

Further, as shown in FIG. 23, in a thickness direction H of the display panel 01, the first connection electrode L1 overlaps the active layer YC, and/or the second connection electrode L2 overlaps the active layer YC. It should be noted that FIG. 23 merely illustrates a case where the second connection electrode L2 overlaps the active layer YC.

In other words, at least one of the first connection electrode L1 and the second connection electrode L2 may overlap the active layer YC, and at least one of the first connection electrode L1 and the second connection electrode L2 may be reused as a shading structure.

In the embodiment of the present application, at least one of the first connection electrode L1 and the second connection electrode L2 may be reused as a shading structure, which may shield the light from a side of the light-emitting device FG from entering the active layer YC of the transistor T, which is conducive to further reducing a current leakage problem with the transistor T, and thus further improving the precision of driving the light-emitting device FG by the pixel circuit XD to operate.

Figure 24:
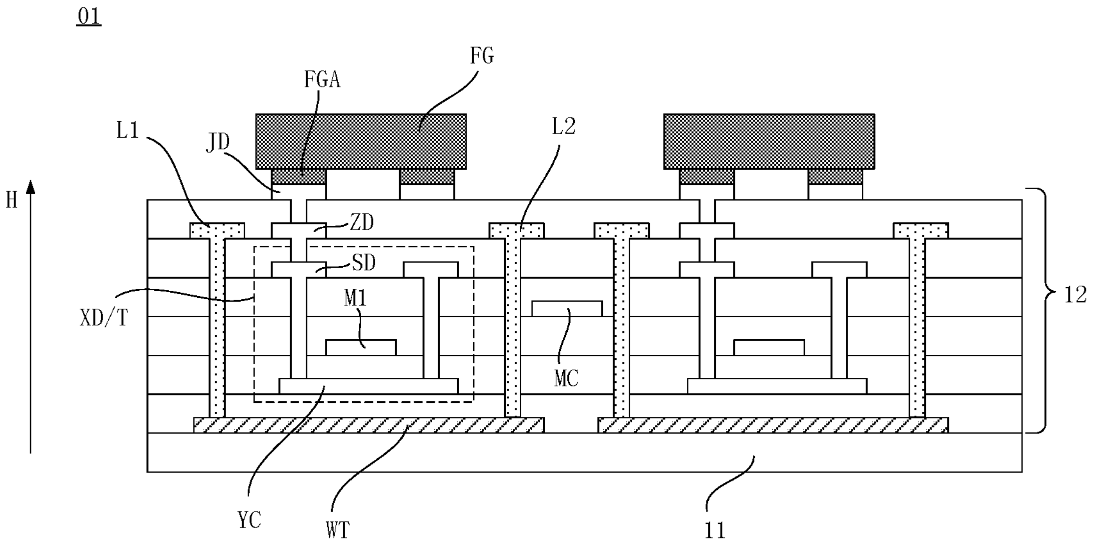
FIG. 24 is a structural schematic diagram of another display panel provided by an embodiment of the present application.
Figure 25:
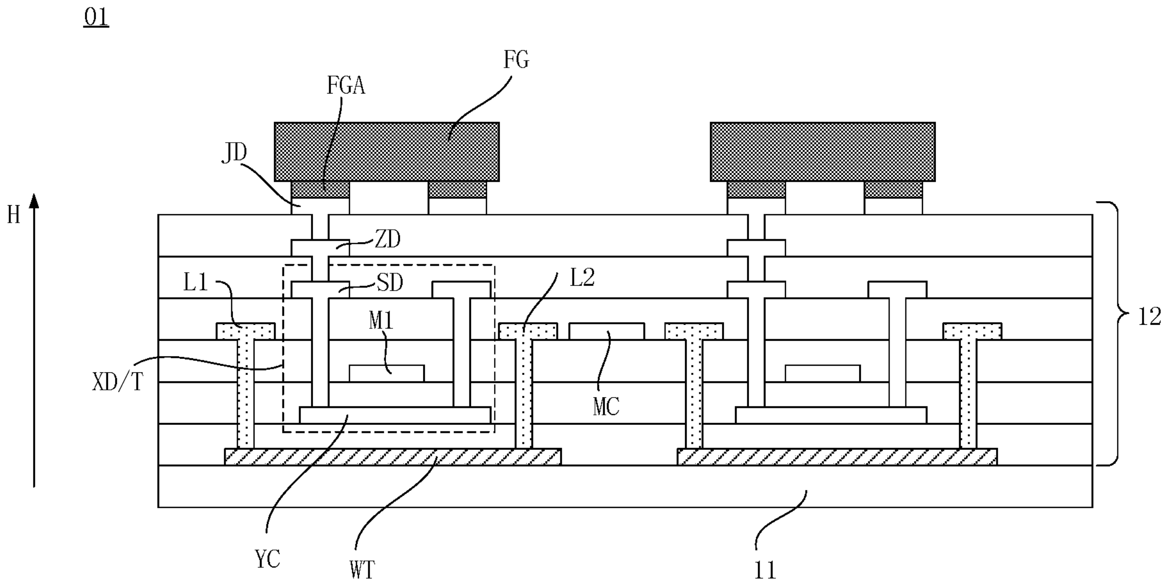
FIG. 25 is a structural schematic diagram of another display panel provided by an embodiment of the present application.
Figure 26:
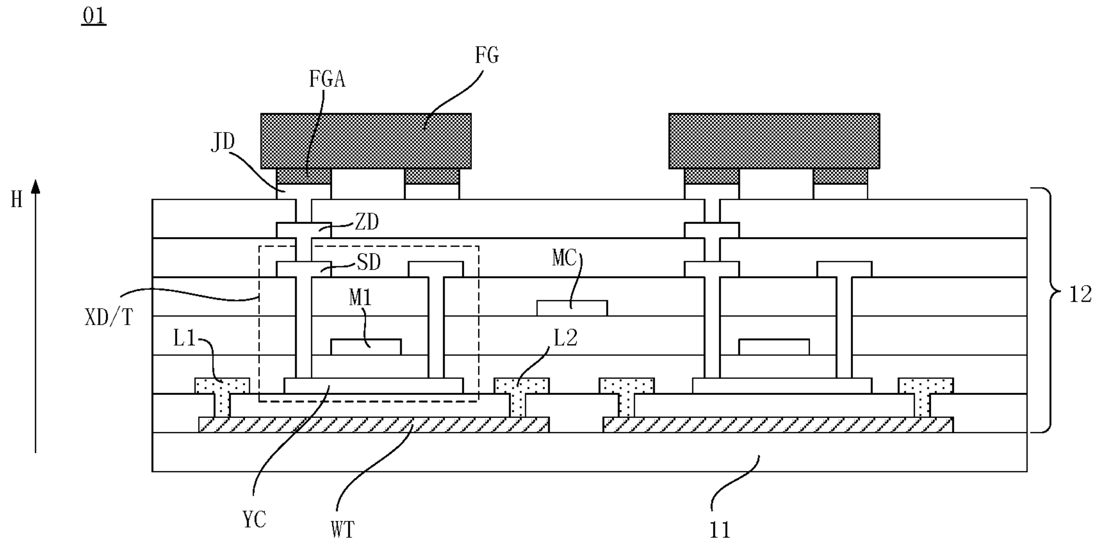
FIG. 26 is a structural schematic diagram of another display panel provided by an embodiment of the present application.

FIG. 24 is a structural schematic diagram of another display panel provided by an embodiment of the present application, FIG. 25 is a structural schematic diagram of another display panel provided by an embodiment of the present application, and FIG. 26 is a structural schematic diagram of another display panel provided by an embodiment of the present application.

In an embodiment of the present application, a structure of a drive circuit layer 12 may be as shown in FIG. 2 and FIG. 24 to FIG. 26. A drive circuit layer 12 comprises:

- a temperature detection structure WT located on a side of the substrate 11; an active layer YC of a transistor T, located on a side of the temperature detection structure WT away from the substrate 11, the transistor T may be a low-temperature polysilicon thin film transistor, and the active layer YC comprises a semiconductor material;
- a gate layer M1 of the transistor T, located on a side of the active layer YC away from the substrate 11, and an inter-gate insulation layer may be provided between the gate layer M1 and the active layer YC;
- a capacitor plate layer MC located on a side of the gate layer M1 away from the substrate 11;
- a first electrode SD of the transistor T, connected to the active layer YC through a contact via hole, the first electrode SD may be a source or a drain of the transistor T, and the first electrode SD is located on a side of the capacitor plate layer MC away from the substrate 11; and
- a transfer connection electrode ZD and a contact electrode JD, the transfer connection electrode ZD is located on a side of the first electrode SD away from the substrate 11, and the contact electrode JD is located on a side of the transfer connection electrode ZD away from the substrate 11.

The contact electrode JD is connected to a light-emitting device FG, the contact electrode JD is connected to the first electrode SD of the transistor T through the transfer connection electrode ZD, and a drive signal transmitted by a pixel circuit XD is transmitted to the light-emitting device FG through the transfer connection electrode ZD and the contact electrode JD. Provision of the transfer connection electrode ZD can improve the reliability of connecting the contact electrode JD to the first electrode SD of the transistor T.

A first connection electrode L1 and a second connection electrode L2 are provided in a same layer as at least one of the gate layer M1, the capacitor plate layer MC, the first electrode SD, the transfer connection electrode ZD, and the contact electrode JD.

Optionally, as shown in FIG. 2, the first connection electrode L1 and the second connection electrode L2 are provided in a same layer as the contact electrode JD. Optionally, as shown in FIG. 22, the first connection electrode L1 and the second connection electrode L2 are provided in a same layer as the first electrode SD. Optionally, as shown in FIG. 24, the first connection electrode L1 and the second connection electrode L2 are provided in a same layer as the transfer connection electrode ZD. Optionally, as shown in FIG. 25, the first connection electrode L1 and the second connection electrode L2 are provided in a same layer as the capacitor plate layer MC. Optionally, as shown in FIG. 26, the first connection electrode L1 and the second connection electrode L2 are provided in a same layer as the active layer YC.

In the present application, if one is provided in a same layer as the other, then the two may be prepared by using a same material and a same process. When the first connection electrode L1 and the second connection electrode L2 are provided in a same layer as one of the capacitor plate layer MC, the first electrode SD, the transfer connection electrode ZD, and the contact electrode JD, the first connection electrode L1 and the second connection electrode L2 may have a higher conductive performance, which is conducive to reducing the loss of transmitting signals by the first connection electrode L1 and the second connection electrode L2 to the temperature detection structure WT.

When the first connection electrode L1 and the second connection electrode L2 are provided in a same layer as the active layer YC, because a distance between the temperature detection structure WT and the active layer YC is shorter, when the first connection electrode L1 and the second connection electrode L2 are connected to the temperature detection structure WT through via holes, areas of the via holes may be set to be smaller, which is conducive to avoiding the influence of the via holes on another film layer.

Figure 27:
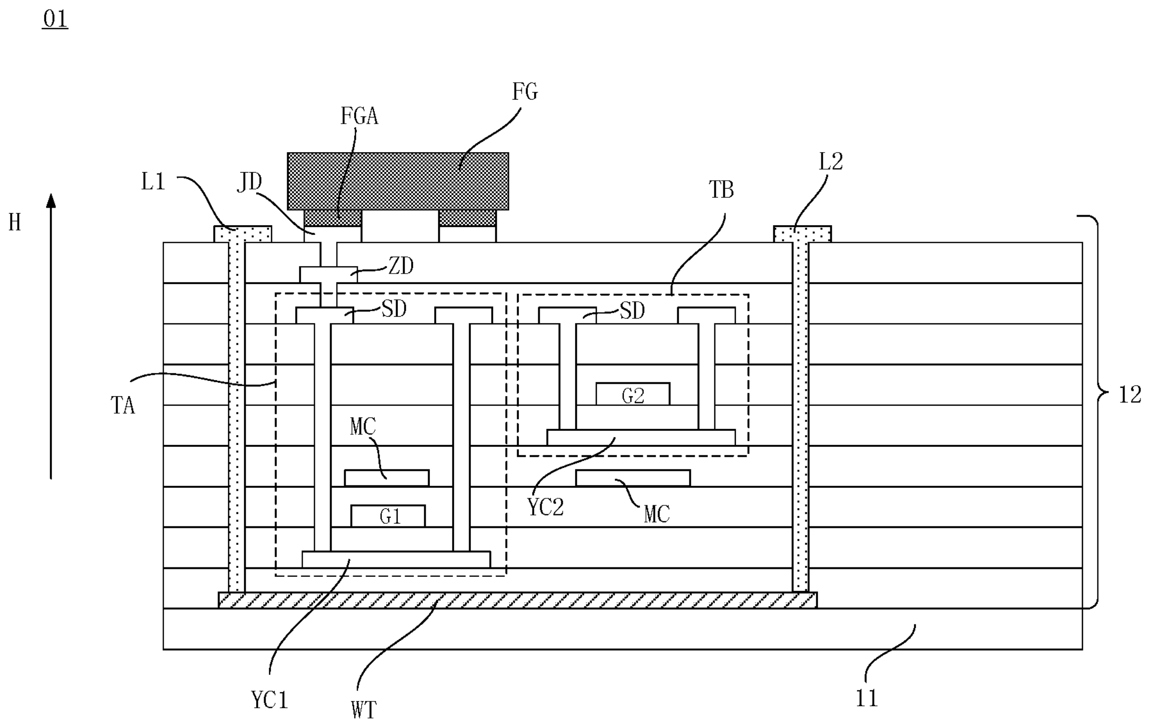
FIG. 27 is a structural schematic diagram of another display panel provided by an embodiment of the present application.

FIG. 27 is a structural schematic diagram of another display panel provided by an embodiment of the present application.

In an embodiment of the present application, as shown in FIG. 27, in the display panel 01, transistors T comprises a first-type transistor TA and a second-type transistor TB, and an active layer of the first-type transistor TA and an active layer of the second-type transistor TB are made of different materials. Optionally, the first-type transistor TA is a low-temperature polysilicon transistor, and the active layer thereof comprises a semiconductor material; and the second-type transistor TB is an oxide transistor, and the active layer thereof comprises an oxide material.

The first-type transistor TA comprises a first active layer YC1 and a first gate G1, and the second-type transistor TB comprises a second active layer YC2 and a second gate G2. A first electrode SD of the first-type transistor TA is connected to the first active layer YC1, a first electrode SD of the second-type transistor TB is connected to the second active layer YC2, and the first electrode SD of the first-type transistor TA and the first electrode SD of the second-type transistor TB are provided in a same layer. That is, a source/drain of the first-type transistor TA may be provided in a same layer as a source/drain of the second-type transistor TB.

Figure 28:
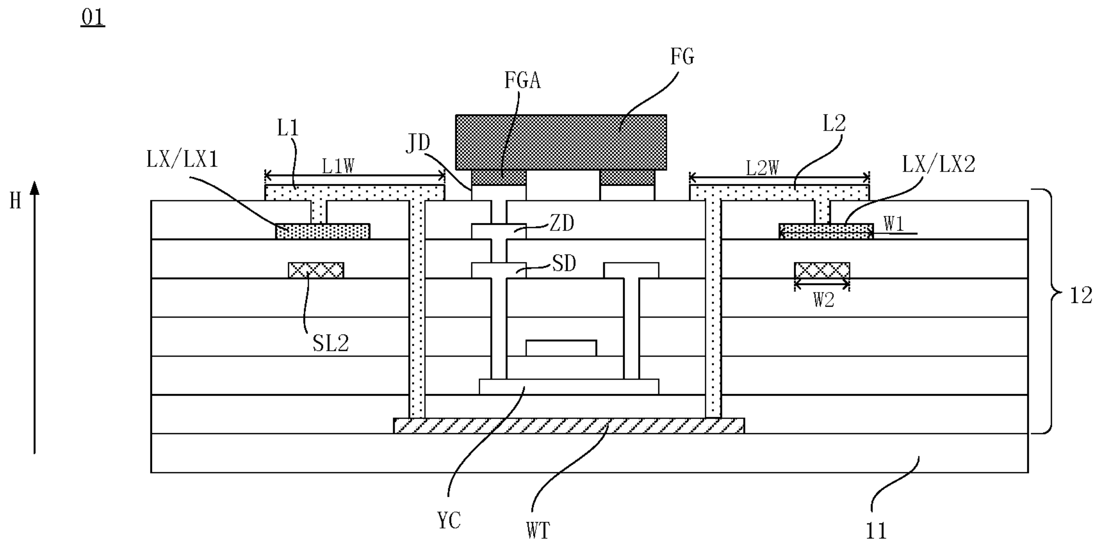
FIG. 28 is a structural schematic diagram of another display panel provided by an embodiment of the present application.

In the embodiment of the present application, a structure of a drive circuit layer 12 may be as shown in FIG. 28. The drive circuit layer 12 comprises:

- a temperature detection structure WT located on a side of a substrate 11, the first active layer YC1 is located on a side of the temperature detection structure WT away from the substrate 11, and the first active layer YC1 may comprise a semiconductor material;
- the first gate G1 located on a side of the first active layer YC1 away from the substrate 11; a capacitor plate layer MC located on a side of the first gate G1 away from the substrate 11;
- the second active layer YC2 located on a side of the capacitor plate layer MC away from the substrate 11, and the second active layer YC2 may comprise an oxide material, such as indium gallium zinc oxide (IGZO); and the second gate G2 located on a side of the second active layer YC2 away from the substrate 11;
- the first electrode SD of the second-type transistor TB and the first electrode SD of the first-type transistor TA, located on a side of the second gate G2 away from the substrate 11; and
- a transfer connection electrode ZD and a contact electrode JD, the transfer connection electrode ZD is located on a side of the first electrode SD of the second-type transistor TB away from the substrate, and the contact electrode JD is located on a side of the transfer connection electrode ZD away from the substrate 11.

The contact electrode JD is connected to a light-emitting device FG, the contact electrode JD is connected to the first electrode SD of the first-type transistor TA or the second-type transistor TB through the transfer connection electrode ZD, and a drive signal transmitted by a pixel circuit XD is transmitted to the light-emitting device FG through the transfer connection electrode ZD and the contact electrode JD. Provision of the transfer connection electrode ZD can improve the reliability of connecting the contact electrode JD to the first electrode SD.

Optionally, as shown in FIG. 28, the contact electrode JD is connected to the first electrode SD of the first-type transistor TA through the transfer connection electrode ZD, and the first-type transistor TA may be a transistor for controlling output of a drive current in the pixel circuit XD.

The first connection electrode L1 and the second connection electrode L2 are provided in a same layer as at least one of the first active layer YC1, the second active layer YC2, the first gate G1, the second gate G2, the capacitor plate layer MC, the first electrode SD, the transfer connection electrode ZD, and the contact electrode JD.

It should be noted that FIG. 27 merely illustrates that the first connection electrode L1 and the second connection electrode L2 are provided in a same layer as the contact electrode JD.

In the embodiment of the present application, the first gate G1, the second gate G2, the capacitor plate layer MC, the first electrode SD, the transfer connection electrode ZD, and the contact electrode JD generally comprise a metal material. When the first connection electrode L1 and the second connection electrode L2 are provided in a same layer as at least one of them, the first connection electrode L1 and the second connection electrode L2 may have a high conductive performance, which is conducive to reducing the loss of transmitting signals by the first connection electrode L1 and the second connection electrode L2 to the temperature detection structure WT.

When the first connection electrode L1 and the second connection electrode L2 are provided in a same layer as the first active layer YC1, a distance between the first connection electrode L1 and the second connection electrode L2 and the temperature detection structure WT may be shorter. Therefore, when the first connection electrode L1 and the second connection electrode L2 are connected to the temperature detection structure WT through via holes, areas of the via holes may be set to be smaller, which is conducive to avoiding the influence of the via holes on another film layer. Certainly, to improve structural diversity of the display panel 01, the first connection electrode L1 and the second connection electrode L2 may be alternatively provided in a same layer as the second active layer YC2.

In an embodiment of the present application, as shown in FIG. 12 to FIG. 14, the display panel 01 further comprises connecting wires LX, which comprise a first connecting wire LX1 and a second connecting wire LX2. Wherein one end of the first connecting wire LX1 is connected to the first connection electrode L1, and the other end is configured for receiving an electrical signal; and one end of the second connecting wire LX2 is connected to the second connection electrode L2, and the other end is configured for receiving an electrical signal.

In other words, the temperature detection structure WT may receive an electrical signal through the first connection electrode L1 and the first connecting wire LX1, and may receive an electrical signal through the second connection electrode L2 and the second connecting wire LX2.

Optionally, the first connecting wire LX1 is provided in a same layer as the first connection electrode L1, and the second connecting wire LX2 is provided in a same layer as the second connection electrode L2. Certainly, the first connecting wire LX1 and the first connection electrode L1 may be alternatively provided in different layers, and the two are connected through a via hole. Similarly, the second connecting wire LX2 and the second connection electrode L2 may be alternatively provided in different layers, and the two are connected through a via hole.

Optionally, the connecting wires LX are provided in a same layer as a data line or a power line in the display panel 01. That is, the connecting wires LX and the data line or the power line may be prepared by using a same material and a same process.

The data line or the power line in the display panel 01 is usually prepared by using a metal with good conductivity, and a thickness of the data line and a thickness of the power line are also larger. Provision of the connecting wires LX in a same layer as the data line or the power line is conducive to ensuring a better conductive performance and a small resistance value of the connecting wires LX, which is conducive to reducing the loss of an electrical signal received by the temperature detection structure WT, and reducing a proportion of a resistance value of the connecting wires LX in a resistance value of the temperature detection structure WT, the first connection electrode L1, the second connection electrode L2, and the connecting wires LX as a whole, thereby being conductive to ensuring the precision of the temperature detection structure TW in temperature detection.

In an embodiment of the present application, a temperature coefficient of resistance of the connecting wires LX is less than a temperature coefficient of resistance of the temperature detection structure WT.

It can be understood that the greater the temperature coefficient of resistance, the greater the relative variation in resistance value per unit temperature variation.

In the embodiment of the present application, if the temperature coefficient of resistance of the connecting wires LX is set to be smaller, a proportion of a variation in a resistance value of the connecting wires LX in a variation in a resistance value of the temperature detection structure WT, the first connection electrode L1, the second connection electrode L2, and the connecting wires LX as a whole can be reduced in a high-temperature environment, which is conducive to increasing a proportion of a variation in a resistance value of the temperature detection structure WT, and thus improving the precision of the temperature detection structure TW in temperature detection.

FIG. 28 is a structural schematic diagram of another display panel provided by an embodiment of the present application.

As shown in FIG. 28, in an embodiment of the present application, the display panel 01 further comprises a second signal line SL2, and connecting wires LX and the second signal line SL2 are provided in different layers and have a same extension direction.

The second signal line SL2 may be a data line or a power line in the display panel 01, and the second signal line SL2 may extend in a column direction of the display panel 01. That is, as a possible implementation, the connecting wires LX as well as the data line and the power line in the display panel 01 may be provided in different layers.

Certainly, the second signal line SL2 may be alternatively a scan line or a light-emitting control signal line in the display panel 01, and the second signal line SL2 may extend in a row direction of the display panel 01. The second signal line SL2 may be the same type of signal line as the first signal line SL1 in the foregoing embodiment.

Wherein in a thickness direction H of the display panel 01, the connecting wires LX overlap the second signal line SL2.

In the embodiment of the present application, provision of the connecting wires LX overlapping the second signal line SL2 is conducive to reducing an occupation area of the connecting wires LX and the second signal line SL2 as a whole in the display panel 01, and increasing design space of a wire in the display panel 01. In addition, when the display panel 01 is a transparent display panel, the connecting wires LX overlapping the second signal line SL2 is also conducive to improving the transparency of the display panel 01 and thus improving a transparent effect of the transparent display panel.

Optionally, as shown in FIG. 28, a line width of a connecting wire LX is W1, wherein 10 μm≤W1≤20 μm.

Further, as shown in FIG. 28, a line width W1 of a connecting wire LX may be greater than or equal to a line width W2 of the second signal line SL2. When the connecting wires LX overlap the second signal line SL2, the connecting wires LX may cover the second signal line SL2. FIG. 28 merely illustrates a case wherein W1>W2.

In this way, it is conducive to ensuring that a resistance value of a connecting wire LX is smaller, which is conducive to further ensuring that a proportion of a resistance value of the connecting wires LX in a resistance value of the temperature detection structure WT, the first connection electrode L1, the second connection electrode L2, and the connecting wires LX as a whole is smaller, and further ensuring the precision of the temperature detection structure TW in temperature detection.

Still referring to FIG. 28, in an embodiment of the present application, a line width W1 of the first connecting wire LX1 is less than a width L1W of the first connection electrode L1, and a line width W1 of the second connecting wire LX2 is less than a width L2W of the second connection electrode L2.

It can be learned from the foregoing analysis that the first connection electrode L1 and the second connection electrode L2 may be connected to the temperature detection structure WT through via holes, the first connecting wire LX1 may be connected to the first connection electrode L1 through a via hole, and the second connecting wire LX2 may be connected to the second connection electrode L2 through a via hole. In the present application, providing a larger width of the first connection electrode L1 and a larger width of the second connection electrode L2 can reduce the influence of a puncturing error on the connection between the first connection electrode L1 and the first connecting wire LX1 and the temperature detection structure WT, and the influence of a puncturing error on the connection between the second connection electrode L2 and the second connecting wire LX2 and the temperature detection structure WT, which is conducive to improving the reliability of connection between the first connection electrode L1 and the first connecting wire LX1 and the temperature detection structure WT and the reliability of connection between the second connection electrode L2 and the second connecting wire LX2 and the temperature detection structure WT.

The first connecting wire LX1 and the second connecting wire LX2 may be located between two adjacent columns of pixel circuits or between two adjacent rows of pixel circuits, or the first connecting wire LX1 and the second connecting wire LX2 may be located between different pixel circuit columns or between different pixel circuit rows.

In an embodiment of the present application, still referring to FIG. 2, the display panel 01 comprises a substrate 11 and a light-emitting device FG, the temperature detection structure WT and the light-emitting device FG are located on a same side of the substrate 11, and in a direction H perpendicular to a plane of the substrate 11, the temperature detection structure WT overlaps the light-emitting device LG.

In addition, the display panel 01 further comprises a drive circuit layer 12, which is provided on the substrate 11 and comprises a transistor T, and the light-emitting device FG is provided on the drive circuit layer 12. The temperature detection structure WT may be provided in the drive circuit layer 12, that is, the temperature detection structure WT may be located on a side of the light-emitting device FG facing towards the substrate 11, and the light-emitting device FG may emit light to a side away from the substrate 11.

In the embodiment of the present application, the temperature detection structure WT overlaps the light-emitting device FG. On one hand, a distance between the temperature detection structure WT and the light-emitting device FG is shorter, which is conducive to ensuring that a temperature detected by the temperature detection structure WT is approximately the same as the temperature at the position where the light-emitting device FG is located, and thus performing targeted color luminance compensation for light-emitting devices FG with different light-emitting colors, and reducing a color deviation of the display panel 01; and on the other hand, when the display panel 01 is a transparent display panel, the temperature detection structure WT can reduce the influence on the transparency of the display panel while realizing the temperature detection of the light-emitting device FG, which is conducive to ensuring the transparency of the transparent display panel.

In an implementation of this embodiment of the present application, as shown in FIG. 15, the temperature detection structure WT overlaps at least two light-emitting devices FG.

Optionally, light-emitting colors of the at least two light-emitting devices FG overlapping the temperature detection structure WT are the same. For example, when a same pixel circuit XD drives a plurality of light-emitting devices FG with a same light-emitting color, the temperature detection structure WT may overlap all the plurality of light-emitting devices FG. In this way, it is advantageous to detect an average of the temperatures at the positions where the plurality of light-emitting devices FG are located, and when color luminance compensation is performed for these light-emitting devices FG, it is advantageous to avoid overcompensation or undercompensation with a larger error for one of the light-emitting devices FG.

Optionally, a light-emitting color of at least one of the at least two light-emitting devices FG overlapping the temperature detection structure WT is different from that of the other. In this way, the temperature detection structure WT may detect temperatures at the positions where the two light-emitting devices FG with different light-emitting colors are located at the same time, and in turn adaptive compensation is performed for the color luminance of these light-emitting devices FG, which is conducive to reducing the quantity of the temperature detection structures WT required in the display panel 01, reducing the wiring complexity in the display panel 01, and reducing the difficulty of preparing the display panel 01.

Further, as shown in FIG. 18, the at least two light-emitting devices FG overlapping the temperature detection structure WT comprise a first light-emitting device FG1, a second light-emitting device FG2, and a third light-emitting device FG3 that have different light-emitting colors. The first light-emitting device FG1 may be a light-emitting device that emits red light, the second light-emitting device FG2 may be a light-emitting device that emits green light, and the third light-emitting device FG3 may be a light-emitting device that emits blue light.

The temperature detection structure WT overlaps all the first light-emitting device FG1, the second light-emitting device FG2, and the third light-emitting device FG3. That is, the same temperature detection structure WT may detect the temperatures at the positions where the first light-emitting device FG1, the second light-emitting device FG2, and the third light-emitting device FG3 are located. It is conducive to further reducing the quantity of the temperature detection structures WT required in the display panel 01, and reducing the wiring complexity in the display panel 01.

In addition, the first light-emitting device FG1, the second light-emitting device FG2, and the third light-emitting device FG3 that have different light-emitting colors may form a pixel unit, which is conducive to performing targeted color luminance compensation for pixel units in different regions of the display panel 01, thereby achieving display uniformity of the display panel 01.

Figure 29:
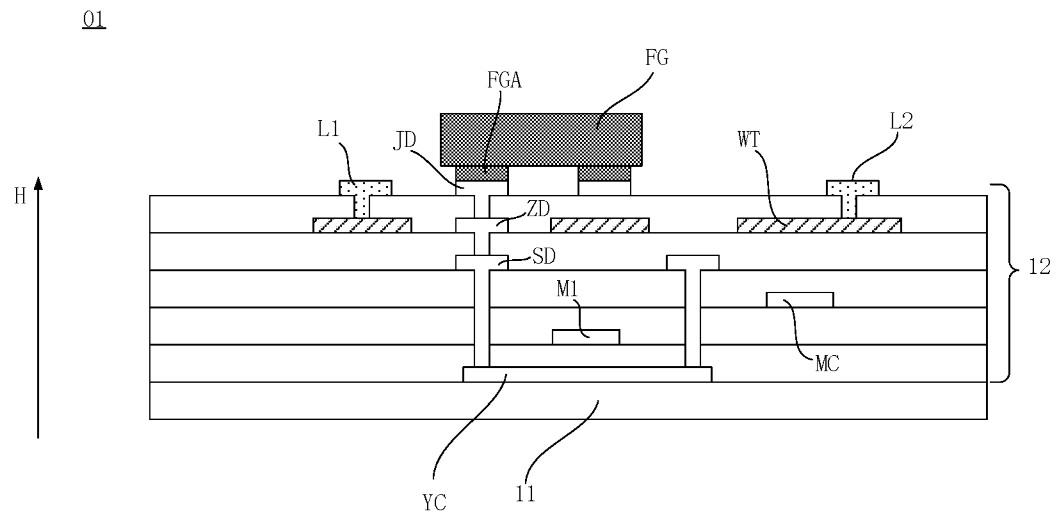
FIG. 29 is a structural schematic diagram of another display panel provided by an embodiment of the present application.

FIG. 29 is a structural schematic diagram of another display panel provided by an embodiment of the present application.

In an embodiment of the present application, the temperature detection structure WT is located between the transistor T and the light-emitting device FG, and does not overlap the transfer connection electrode ZD in a thickness direction H of the display panel 01.

Optionally, as shown in FIG. 29, the temperature detection structure WT may be provided in a same layer as the transfer connection electrode ZD, and the first connection electrode L1 and the second connection electrode L2 are provided in a same layer as the contact electrode JD.

In the embodiment of the present application, the temperature detection structure WT does not affect provision of the transfer connection electrode ZD, which is conducive to improving the reliability of connecting the contact electrode JD to the transistor T through the transfer connection electrode ZD. In addition, the temperature detection structure WT may further function as a physical barrier, which is conducive to reducing the influence of the light-emitting device FG on the transistor T in a binding process and improving the stability of the transistor T.

Further, in a thickness direction H of the display panel 01, the temperature detection structure WT overlaps the active layer YC of the transistor T, and the temperature detection structure WT may comprise metal molybdenum. In this way, the temperature detection structure WT may further play a role of shielding while realizing temperature detection, which is conducive to avoiding the occurrence of leakage current of the transistor T due to light form a side of the light-emitting device FG entering the active layer YC of the transistor T.

It should be noted that, in FIG. 29, the temperature detection structure WT is actually an integrated structure. For convenience of illustration only, the temperature detection structure WT is not connected at some positions.

Figure 30:
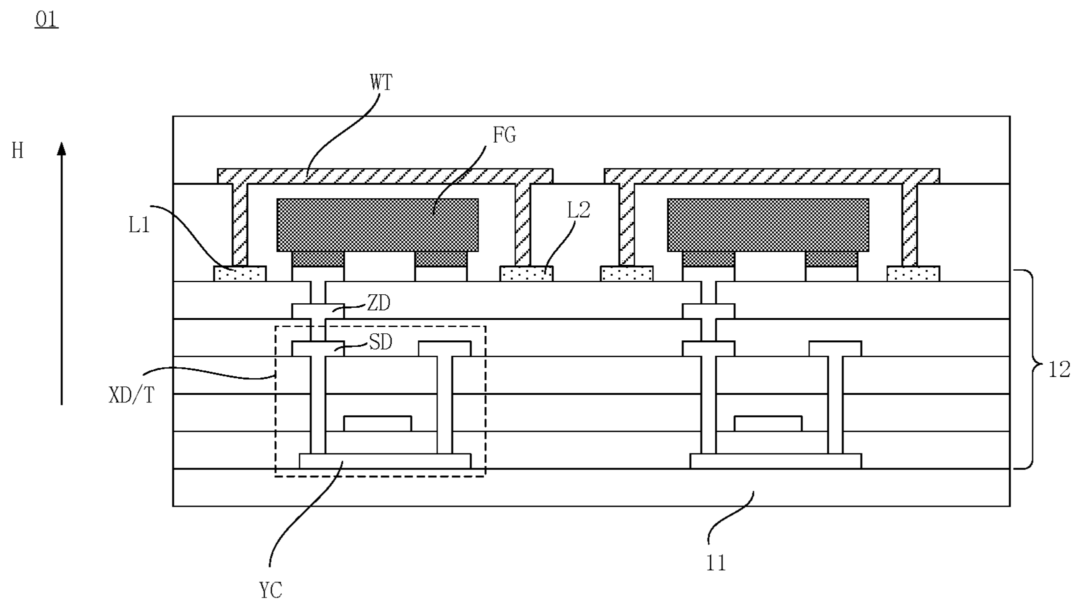
FIG. 30 is a structural schematic diagram of another display panel provided by an embodiment of the present application.

FIG. 30 is a structural schematic diagram of another display panel provided by an embodiment of the present application.

In an embodiment of the present application, as shown in FIG. 30, the display panel 01 further comprises a drive circuit layer 12 located on a substrate 11, and a light-emitting device FG is located on the drive circuit layer 12. That is, the drive circuit layer 12 may be located on a side of the substrate 11, and the light-emitting device FG is located on a side of the drive circuit layer 12 away from the substrate 11.

A temperature detection structure WT is located on a side of the light-emitting device FG away from the drive circuit layer 12. In this case, the light-emitting device FG may emit light toward the substrate 11 side. The temperature detection structure WT may comprise a metal material.

In the embodiment of the present application, the temperature detection structure WT may further reflect light emitted from the light-emitting device FG to a side away from the drive circuit layer 12 to the substrate 11 side while detecting the temperature at the position where the light-emitting device FG is located, which is conducive to ensuring an effect of emitting light from the light-emitting device FG to the side of the substrate 11.

Figure 31:
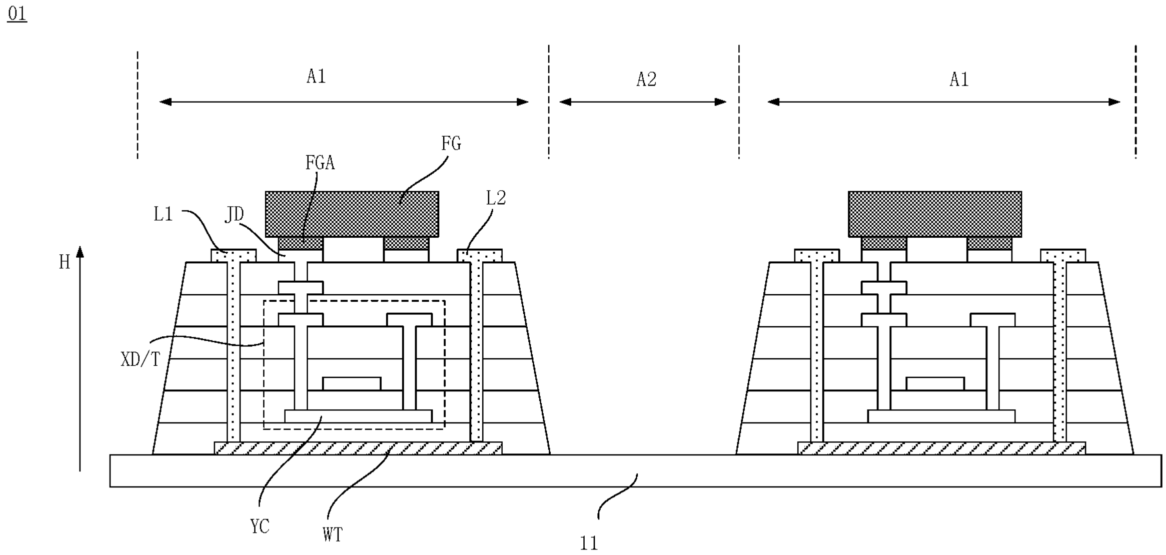
FIG. 31 is a structural schematic diagram of another display panel provided by an embodiment of the present application.

FIG. 31 is a structural schematic diagram of another display panel provided by an embodiment of the present application.

In an embodiment of the present application, as shown in FIG. 31, the display panel 01 comprises a pixel circuit region A1 and a transparent region A2, the pixel circuit region A1 comprises a pixel circuit XD and a light-emitting device FG, and transparency of the transparent region A2 is greater than that of the pixel circuit region A1. That is, the display panel 01 may be a transparent display panel.

Wherein a temperature detection structure WT is located in the pixel circuit region A1.

In the embodiment of the present application, provision of the temperature detection structure WT in the pixel circuit region A1 can avoid the influence of the temperature detection structure WT on the transparent region A2 of the display panel while the temperature at the position where the light-emitting device FG is located is detected, which is conducive to ensuring the transparency of the transparent display panel.

Figure 32:
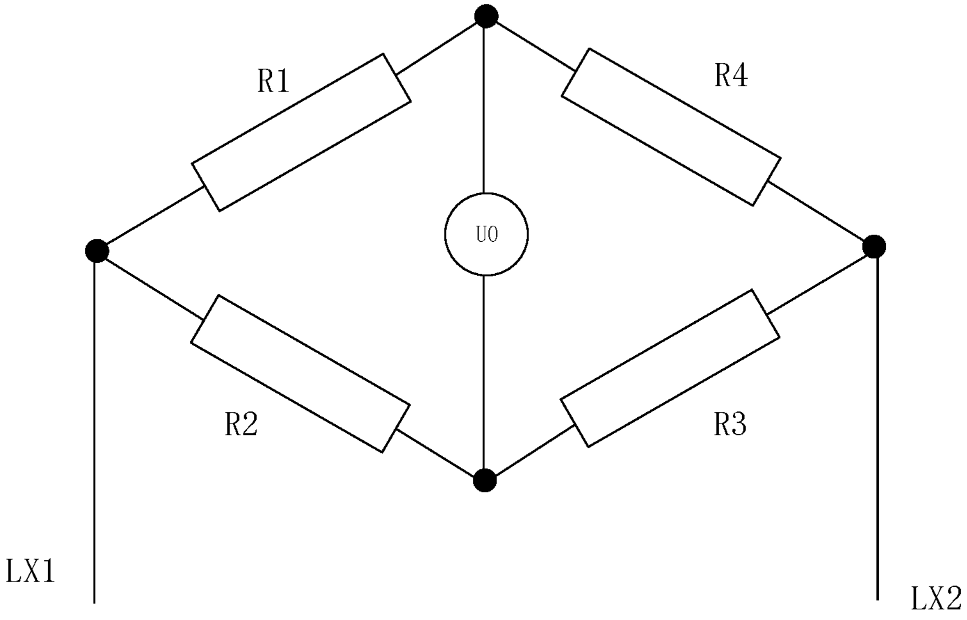
FIG. 32 is an equivalent circuit diagram of a temperature detection structure provided by an embodiment of the present application.

FIG. 32 is an equivalent circuit diagram of a temperature detection structure provided by an embodiment of the present application.

In an embodiment of the present application, the temperature detection structure WT comprises a metal layer and a semiconductor layer. The metal layer may be located between the active layer YC of the transistor T and the substrate 11, the semiconductor layer may be on a same layer as the active layer YC of the transistor T, and the metal layer may be connected to the semiconductor layer through a via hole. Optionally, the metal layer comprises molybdenum, and the semiconductor layer comprises silicon.

As shown in FIG. 32, the metal layer comprises a first resistor R1, a second resistor R2, and a third resistor R3, and the semiconductor layer comprises a fourth resistor R4. A first end of the first resistor R1 is electrically connected to the first connection electrode L1, a second end of the first resistor R1 is electrically connected to a first end of the fourth resistor R4, and a second end of the fourth resistor R4 is electrically connected to the second connection electrode L2; a first end of the second resistor R2 is electrically connected to the first end of the first resistor R1, a second end of the second resistor R2 is electrically connected to a first end of the third resistor R3, and a second end of the third resistor R3 is electrically connected to the second end of the fourth resistor R4.

Wherein a resistivity of the first resistor R1, a resistivity of the second resistor R2, and a resistivity of the third resistor R3 increase with an increasing temperature, and a resistivity of the fourth resistor R4 decreases with an increasing temperature.

In the embodiment of the present application, the first resistor R1, the second resistor R2, the third resistor R3, and the fourth resistor R4 may form a Wheatstone bridge. That is, the temperature detection structure WT may comprise a Wheatstone bridge. Because resistance change trends of the first resistor R1, the second resistor R2 and the third resistor R3 are opposite to a resistance change trend of the fourth resistor R4 with a change in temperature, a difference between a resistance value of the fourth resistor R4 and a resistance value of the first resistor R1, the second resistor R2, or the third resistor R3 becomes larger with a change in temperature, and a change in temperature is more easily measured by detecting the resistance values of the first resistor R1, the second resistor R2, the third resistor R3, and the fourth resistor R4, which is conducive to improving the precision of detecting temperature by the Wheatstone bridge, and in turn improving the precision of color luminance compensation for the light-emitting device FG at different temperatures.

In an embodiment of the present application, the temperature detection structure WT is made of at least one of molybdenum, aluminum, titanium, and a semiconductor material.

Optionally, the temperature detection structure WT is a single-layer structure comprising metal molybdenum. A resistance and a temperature coefficient of a resistance of molybdenum are both larger, which is conducive to ensuring that a proportion of a resistance value of the temperature detection structure WT in a resistance value of the temperature detection structure WT, the first connection electrode L1, the second connection electrode L2, and the connecting wires LX as a whole is larger, and improving the precision of the temperature detection structure TW in temperature detection.

Optionally, the temperature detection structure WT may be alternatively a laminated metal structure comprising titanium/aluminum/titanium or titanium/molybdenum/titanium. Optionally, the temperature detection structure WT is a multi-layer structure that comprises one layer of molybdenum metal and one layer of semiconductor material.

In this case, the first connection electrode L1, the second connection electrode L2, and the connecting wires LX may comprise at least one of a manganin material and a constantan material. Because a temperature coefficient of resistance of the manganin material or the constantan material is relatively small, resistance values of the first connection electrode L1, the second connection electrode L2, and the connecting wires LX are less affected by a temperature variation, which is conducive to improving the precision of the temperature detection structure TW in temperature detection when the temperature changes.

Figure 33:
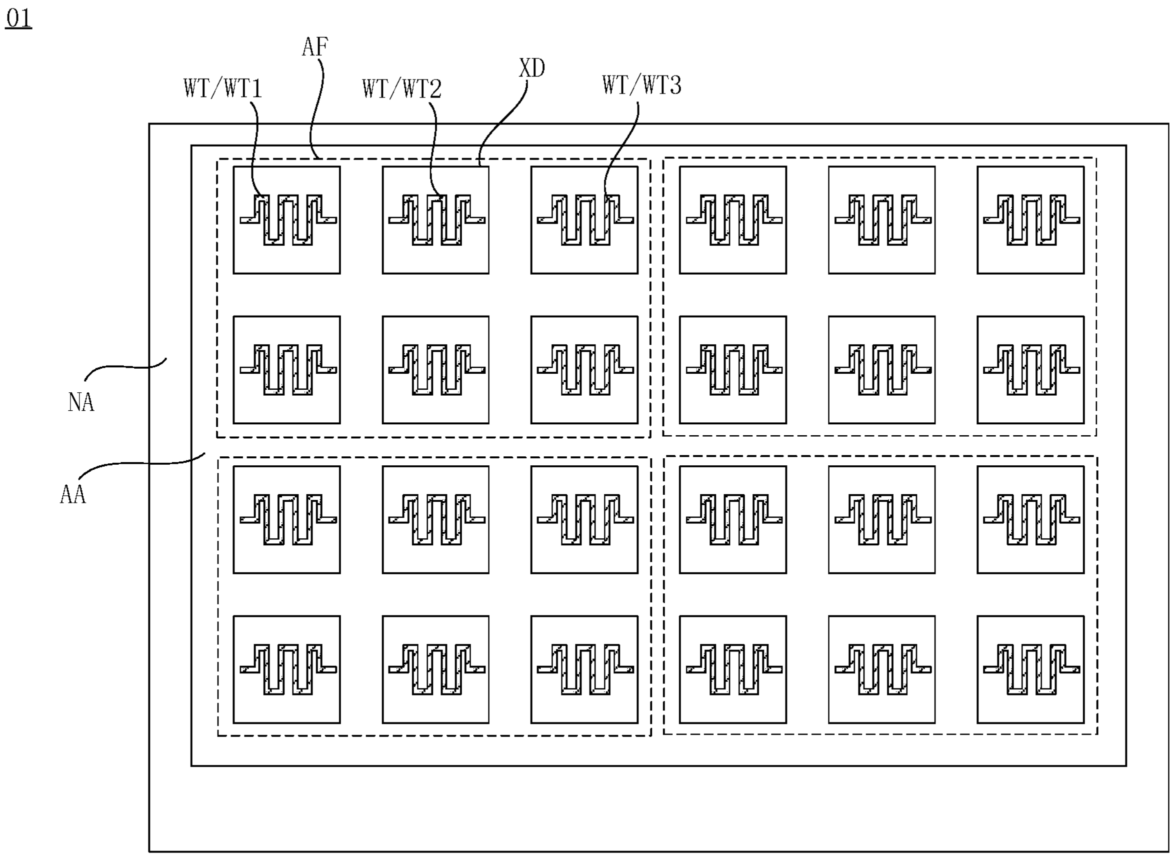
FIG. 33 is a plane schematic diagram of a display panel provided by an embodiment of the present application.

FIG. 33 is a plane schematic diagram of a display panel provided by an embodiment of the present application.

In an embodiment of the present application, as shown in FIG. 33, the display panel 01 comprises a display region AA and a non-display region NA, which surrounds the display region AA, the display region AA comprises a plurality of partitions AF, and at least a part of the temperature detection structure WT is located in different partitions AF. Certainly, each partition AF comprises a light-emitting device FG and a pixel circuit XD that drives the light-emitting device FG.

Optionally, as shown in FIG. 33, the plurality of partitions AF are evenly distributed in the display region AA. For example, a plurality of partitions AF may be arranged in an array in the display region AA, and the partitions AF each may have a same area. Certainly, in some other embodiments, partitions with different areas may also exist.

In a same partition AF, an operating temperature of any one of the light-emitting devices FG may be detected by the temperature detection structure WT, so as to improve the precision of color luminance compensation for the light-emitting device FG. Operating temperatures of only a part of the light-emitting devices FG in the partition may be detected, so as to reduce the structural complexity of the display panel 01 and simplify the design difficulty.

In the embodiment of the present application, operating temperatures of light-emitting devices FG in different partitions AF may be detected by the temperature detection structure WT, which is conducive to performing targeted compensation for color luminance of the light-emitting devices FG in different partitions AF, and thus making color luminance of the different partitions AF in the display panel 01 converge, and in turn improving the display uniformity of the display panel 01.

Figure 34:
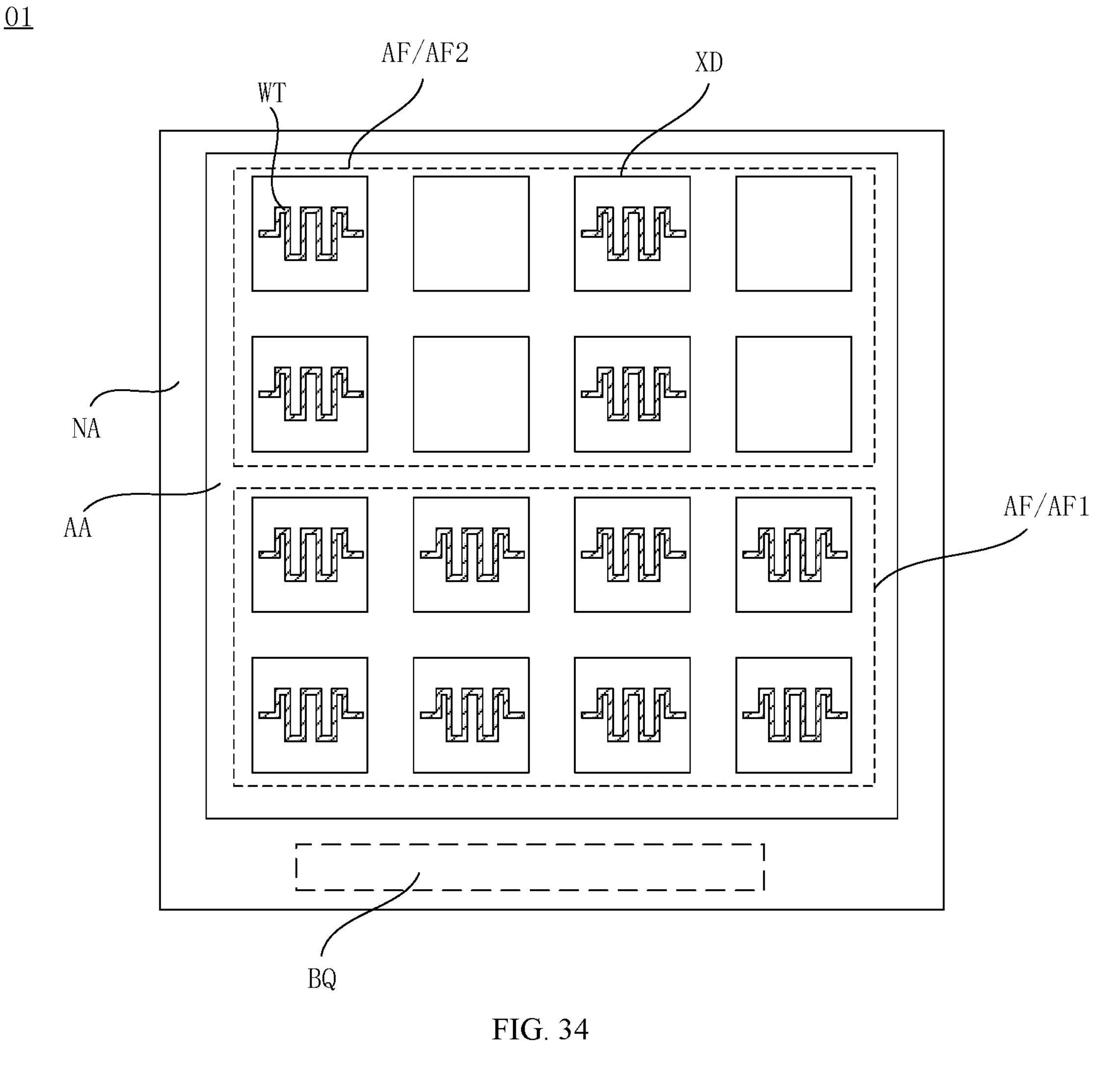
FIG. 34 is a plane schematic diagram of another display panel provided by an embodiment of the present application.

FIG. 34 is a plane schematic diagram of another display panel provided by an embodiment of the present application.

As shown in FIG. 34, in an embodiment of the present application, the display panel 01 comprises a binding region BQ, which is configured for binding a driver chip (not shown in the figure), and the driver chip is configured for providing a display signal for the display panel 01. A plurality of partitions AF comprise a first partition AF1 and a second partition AF2, and the first partition AF1 is close to the binding region BQ relative to the second partition AF2. That is, a length of a signal wire from the driver chip to the first partition AF1 is less than a length of a signal wire from the driver chip to the second partition AF2.

Wherein a density of the temperature detection structure WT in the first partition AF1 is greater than a density of the temperature detection structure WT in the second partition AF2. That is, the quantity of temperature detection structures WT per unit area in the first partition AF1 is greater than the quantity of temperature detection structures WT per unit area in the second partition AF2.

The inventor of the present application has found that the temperature of the driver chip is higher during operation, and the temperature in the first partition AF1 is generally greater than the temperature in the second partition AF2 due to the heat transfer of the temperature at the driver chip. The higher the temperature, the larger the color luminance difference between light-emitting devices FG with different light-emitting colors, and the greater the influence on the uniformity of a display picture.

In the embodiment of the present application, high-density monitoring may be performed on the first partition AF1 with a higher operating temperature, which is conducive to improving the precision of detecting an operating temperature of a light-emitting device FG in the first partition AF1, and thus achieving more accurate color luminance compensation for the first partition AF1 with larger influence on display uniformity, and in turn further improving the display color luminance uniformity of the display panel 01.

It should be noted that when the binding region BQ is located at a back side of the display panel 01, that is, when the driver chip is provided at the back side of the display panel 01, the first partition AF1 may be alternatively a region overlapping the driver chip.

In addition, it is possible to arrange for the density of the temperature detection structures WT to gradually decrease in a direction in which the first partition AF1 points to the second partition AF2.

Figure 35:
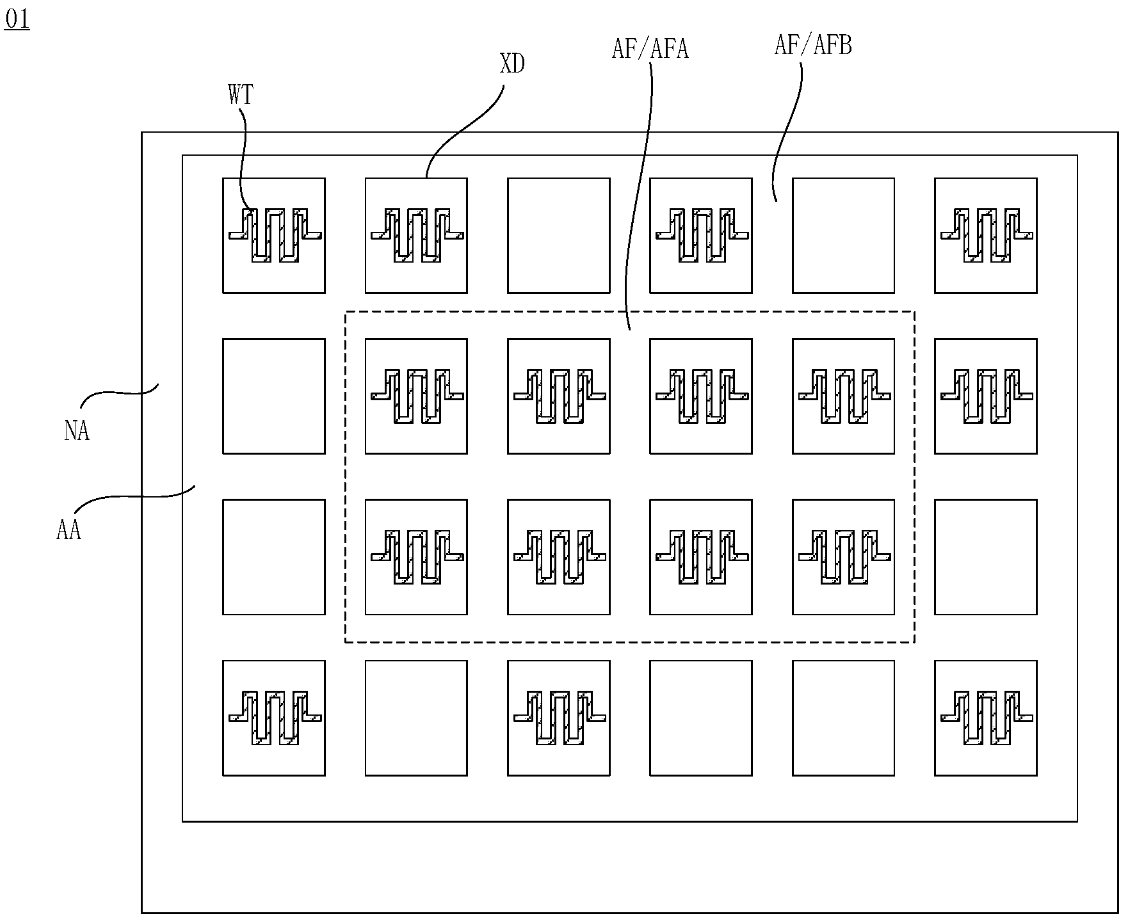
FIG. 35 is a plane schematic diagram of another display panel provided by an embodiment of the present application.

FIG. 35 is a plane schematic diagram of another display panel provided by an embodiment of the present application.

In an embodiment of the present application, as shown in FIG. 35, a plurality of partitions AF comprise an intermediate region AFA and an edge region AFB, and the edge region AFB is close to an edge of the display panel 01 relative to the intermediate region AFA.

Wherein a density of the temperature detection structure WT in the intermediate region AFA is greater than a density of the temperature detection structure WT in the edge region AFB. That is, the quantity of temperature detection structures WT per unit area in the intermediate region AFA is greater than the quantity of temperature detection structures WT per unit area in the edge region AFB.

The inventor of the present application has found that in the display panel 01, a temperature of the intermediate region AFA is generally greater than a temperature of the edge region AFB. The higher the temperature, the larger a color luminance difference between light-emitting devices FG with different light-emitting colors, and the greater the influence on the uniformity of a display picture.

In the embodiment of the present application, high-density monitoring may be performed on the intermediate region AFA with a higher operating temperature, which is conducive to improving the precision of detecting an operating temperature of a light-emitting device FG in the intermediate region AFA, and thus achieving more accurate color luminance compensation for the intermediate region AFA with larger influence on display uniformity, and in turn further improving the display color luminance uniformity of the display panel 01.

In addition, it is possible to arrange for the density of the temperature detection structures WT to gradually decrease in a direction in which the intermediate region AFA points to the edge of the display panel.

Figure 36:
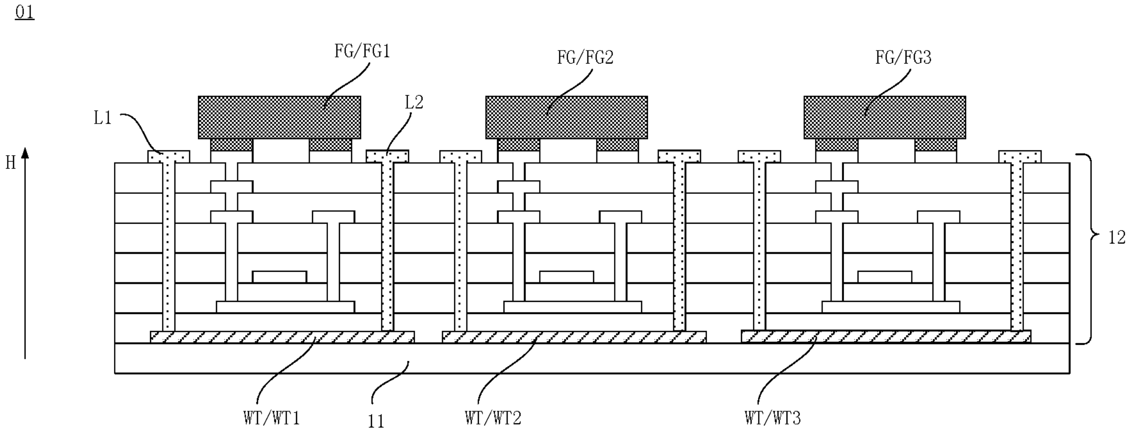
FIG. 36 is a structural schematic diagram of another display panel provided by an embodiment of the present application.

FIG. 36 is a structural schematic diagram of another display panel provided by an embodiment of the present application.

In an embodiment of the present application, as shown in FIG. 36, a plurality of light-emitting devices FG comprise a first light-emitting device FG1, a second light-emitting device FG2, and a third light-emitting device FG3 that have different light-emitting colors. The first light-emitting device FG1 may be a red light-emitting device, the second light-emitting device FG2 may be a green light-emitting device, and the third light-emitting device FG3 may be a blue light-emitting device.

A plurality of temperature detection structures WT comprise a first temperature detection structure WT1, a second temperature detection structure WT2, and a third temperature detection structure WT3. The first temperature detection structure WT1, the second temperature detection structure WT2, and the third temperature detection structure WT3 may be electrically insulated from each other. In a thickness direction H of the display panel 01, at least a part of the first light-emitting device FG1 overlaps the first temperature detection structure WT1, at least a part of the second light-emitting device FG2 overlaps the second temperature detection structure WT2, and at least a part of the third light-emitting device FG3 overlaps the third temperature detection structure WT3.

In other words, the first temperature detection structure WT1 may be configured for detecting an operating temperature of the first light-emitting device FG1, the second temperature detection structure WT2 may be configured for detecting an operating temperature of the second light-emitting device FG2, and the third temperature detection structure WT3 may be configured for detecting an operating temperature of the third light-emitting device FG3.

In the embodiment of the present application, the operating temperatures of the first light-emitting device FG1, the second light-emitting device FG2, and the third light-emitting device FG3 that have different light-emitting colors may be detected by the temperature detection structures WT, which is conducive to performing targeted color luminance compensation for the first light-emitting device FG1, the second light-emitting device FG2, and the third light-emitting device FG3 according to temperature characteristics of color luminance of the first light-emitting device FG1, the second light-emitting device FG2, and the third light-emitting device FG3, and thus further reducing a color deviation problem with the display panel 01 in different application scenarios.

Further, with reference to FIG. 33, the display region AA of the display panel 01 comprises a plurality of partitions FA, and a same partition FA comprises the first temperature detection structure WT1, the second temperature detection structure WT2, and the third temperature detection structure WT3. That is, in at least a part of the partition FA, the operating temperatures of the first light-emitting device FG1, the second light-emitting device FG2, and the third light-emitting device FG3 may be detected by the temperature detection structures WT. In this way, it is conducive to improving the precision of the color luminance compensation for the first light-emitting device FG1, the second light-emitting device FG2, and the third light-emitting device FG3 in different partitions FA, and in turn improving the display effect of the display panel 01.

In an embodiment of the present application, a connecting wire LX transmit a constant current signal or an alternating current signal to the temperature detection structure WT. That is, the detection electrical signal applied to the temperature detection structure WT may be a constant current signals or an alternating current signal.

With reference to the foregoing embodiments, it can be learned that the temperature detection structure WT may receive constant current signals or alternating current signals through the first connection electrode L1, the second connection electrode L2, and the connecting wires LX. Further, a connecting wires LX may receive a constant current signal or an alternating current signal from the driver chip, that is, the driver chip may provide a constant current signal or an alternating current signal to the temperature detection structure WT, and the driver chip may calculate a resistance value of the temperature detection structure WT and a temperature at a position where the temperature detection structure WT is located.

The principle that the temperature detection structure WT can detect the temperature is briefly described below by taking the temperature detection structure WT comprising molybdenum metal as an example.

A resistivity of molybdenum may vary with temperature, and the resistivity of the molybdenum is temperature dependent. A resistance of the temperature detection structure WT may be obtained by applying a current to the temperature detection structure WT and detecting the voltage between the first connection electrode L1 and the second connection electrode L2. Then, a resistivity of the temperature detection structure WT is calculated based on information such as a length and a cross-section of the temperature detection structure WT, and in turn further a temperature at a position where the temperature detection structure WT is located is obtained by conversion.

In the embodiment of the present application, detection of the temperature at the position where the temperature detection structure WT is located may be achieved by transmitting a constant current signal or an alternating current signal to the temperature detection structure WT. In addition, transmitting the current to the temperature detection structure WT also enables the temperature detection structure WT to act as a heater, which is conducive to flexibly changing an operating temperature of the light-emitting device FG, and thus adjusting the color luminance of the light-emitting device FG, and in turn improving the display effect of the display panel 01.

In addition, when an alternating current is transmitted to the temperature detection structure WT, a temperature range that can be detected by the temperature detection structure WT may be adjusted by changing a frequency of the alternating current, so as to ensure that a detection range can be flexibly set as required while the temperature at the position where the light-emitting device FG is located is detected. It may further be detected, according to a material characteristic of the temperature detection structure WT, whether a correspondence between a frequency of the applied alternating current and a voltage, a resistance, and a detection temperature range of the temperature detection structure WT is abnormal, so as to judge whether a film layer structure of the display panel 01 fails, for example, whether a film layer stratification problem occurs.

Figure 37:
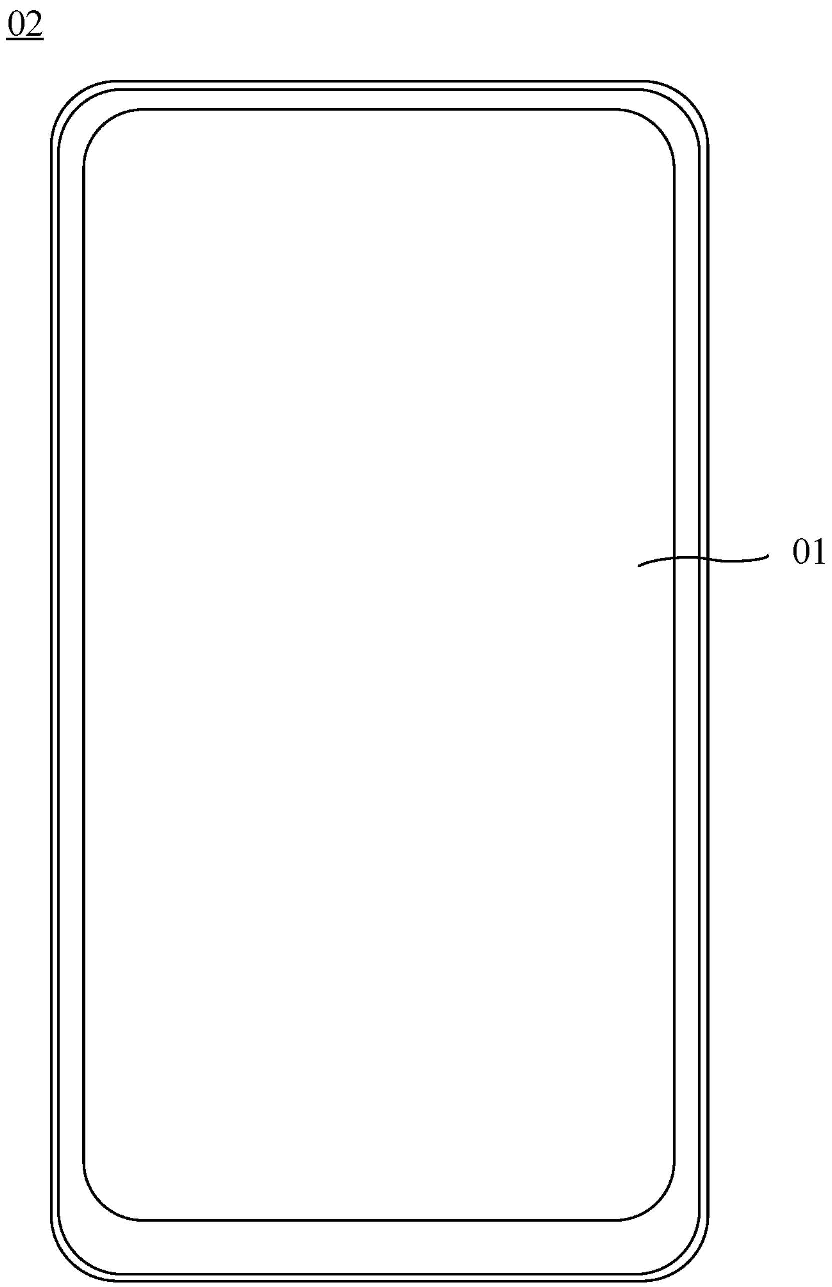
FIG. 37 is a schematic diagram of a display apparatus according to an embodiment of the present application.

FIG. 37 is a schematic diagram of a display apparatus according to an embodiment of the present application.

The present application provides a display apparatus 02. As shown in FIG. 37, the display apparatus 02 comprises the display panel 01 as provided by the foregoing embodiments. For example, the display apparatus 02 may be an electronic apparatus such as a mobile phone, a computer, a television, an in-vehicle display, or a wearable display device. This is not specifically limited in the present application.

The temperature detection structure WT is provided in the display apparatus 02, and thus it is possible to use the temperature detection structure WT to detect the temperatures at the positions where the light-emitting devices FG are located, and to perform targeted color luminance compensation for the light-emitting devices FG with different light-emitting colors based on the detected temperatures and the temperature characteristics of the light-emitting devices FG, which is conducive to ensuring that the color luminance of the display panel 01 meets a specification requirement at different operating temperatures, and reducing the problem of color deviation that is prone to occur in the display panel 01 at a high temperature.

The above descriptions are merely preferred embodiments of the present application and are not intended to limit the present application. Any modification, equivalent replacement and improvement within the spirit and principle of the present application shall be comprised within the protection scope of the present application.

What is claimed is:

1. A display panel, comprising:

a temperature detection structure, a first connection electrode, a second connection electrode, and a plurality of auxiliary temperature detection structures connected to the temperature detection structure;

wherein the temperature detection structure is connected to the first connection electrode and the second connection electrode, respectively; and wherein the plurality of auxiliary temperature detection structures and the temperature detection structure are provided in different layers, and wherein the first connection electrode and the second connection electrode are connected to the temperature detection structure through the plurality of auxiliary temperature detection structures.

2. The display panel according to claim 1, wherein a temperature coefficient of resistance of the first connection electrode is less than a temperature coefficient of resistance of the temperature detection structure; or a temperature coefficient of resistance of the second connection electrode is less than the temperature coefficient of resistance of the temperature detection structure.

3. The display panel according to claim 1, further comprising:

connecting wires, wherein the connecting wires comprise a first connecting wire and a second connecting wire, one end of the first connecting wire is connected to the first connection electrode, and the other end is configured for receiving an electrical signal, and one end of the second connecting wire is connected to the second connection electrode, and the other end is configured for receiving an electrical signal.

4. The display panel according to claim 1, further comprising:

a substrate; and a light-emitting device, wherein the temperature detection structure and the light-emitting device are located on a same side of the substrate, and in a direction perpendicular to a plane of the substrate, the temperature detection structure overlaps the light-emitting device.

5. The display panel according to claim 1, wherein the display panel comprises:

a pixel circuit region; and a transparent region, wherein the temperature detection structure is located in the pixel circuit region.

6. The display panel according to claim 1, wherein the temperature detection structure comprises a metal layer and a semiconductor layer, the metal layer comprises a first resistor, a second resistor, and a third resistor, and the semiconductor layer comprises a fourth resistor, a first end of the first resistor is electrically connected to the first connection electrode, a second end of the first resistor is electrically connected to a first end of the fourth resistor, and a second end of the fourth resistor is electrically connected to the second connection electrode, a first end of the second resistor is electrically connected to the first end of the first resistor, a second end of the second resistor is electrically connected to a first end of the third resistor, and a second end of the third resistor is electrically connected to the second end of the fourth resistor, and wherein a resistivity of the first resistor, a resistivity of the second resistor, and a resistivity of the third resistor increase with an increasing temperature, and a resistivity of the fourth resistor decreases with an increasing temperature.

7. The display panel according to claim 1, wherein a display region of the display panel comprises a plurality of partitions, and at least a part of the temperature detection structure is located in different ones of the partitions.

8. The display panel according to claim 7, wherein the display panel comprises:

a binding region configured for binding a driver chip; and the plurality of partitions comprise a first partition and a second partition, the first partition is close to the binding region relative to the second partition, and a density of the temperature detection structure in the first partition is greater than a density of the temperature detection structure in the second partition; or the plurality of partitions comprise an intermediate region and an edge region, and the edge region is close to an edge of the display panel relative to the intermediate region; and a density of the temperature detection structure in the intermediate region is greater than a density of the temperature detection structure in the edge region.

9. A display panel, comprising:

a temperature detection structure, a first connection electrode, a second connection electrode, a substrate, a drive circuit layer, and a light-emitting device, wherein the temperature detection structure is connected to the first connection electrode and the second connection electrode, respectively; and wherein the drive circuit layer is located on the substrate, and the drive circuit layer comprises a transistor, the light-emitting device is located on the drive circuit layer, the drive circuit layer comprises the temperature detection structure, the first connection electrode, and the second connection electrode, and wherein the transistor comprises an active layer, and the temperature detection structure is located between a film layer where the active layer is located and the substrate.

10. The display panel according to claim 9, wherein the temperature detection structure is a single-layer structure; or the temperature detection structure comprises at least two temperature detection layers and at least one first insulation layer, and the first insulation layer is located between two adjacent temperature detection layers of the at least two temperature detection layers, wherein the two adjacent temperature detection layers are connected in series.

11. The display panel according to claim 9, wherein the drive circuit layer further comprises a second insulation layer;

the second insulation layer is located between the temperature detection structure and the film layer where the active layer is located; and in a direction perpendicular to a plane of the substrate, a distance between the temperature detection structure and the film layer where the active layer is located is H1, wherein $0.2\ \mu m \leq H1 \leq 5\ \mu m$.

12. The display panel according to claim 9, wherein the first connection electrode is located on a side of the film layer where the active layer is located that is away from the temperature detection structure, the first connection electrode is connected to the temperature detection structure through a first via hole, the second connection electrode is located on the side of the film layer where the active layer is located that is away from the temperature detection structure, the second connection electrode is connected to the temperature detection structure through a second via hole, the drive circuit layer comprises a first signal line and a pixel circuit, the pixel circuit is configured for driving the light-emitting device, and the pixel circuit comprises the transistor, the first signal line is configured for providing a signal for the pixel circuit, and in an extension direction of the first signal line, the first connection electrode and the second connection electrode are located on a same side of the pixel circuit, or in an extension direction of the first signal line, the first connection electrode and the second connection electrode are located on opposite sides of the pixel circuit.

13. The display panel according to claim 12, wherein the drive circuit layer comprises a contact electrode, the light-emitting device comprises an electrode connected to the contact electrode, and both the first connection electrode and the second connection electrode are provided in a same layer as the contact electrode, or the transistor comprises a first electrode, the first electrode is connected to the active layer through a contact via hole, and both the first connection electrode and the second connection electrode are provided in a same layer as the first electrode.

14. The display panel according to claim 9, wherein the drive circuit layer comprises a plurality of pixel circuits, the pixel circuits are configured for driving the light-emitting devices, and the pixel circuits comprise the transistors, and the temperature detection structure overlaps at least two of the pixel circuits.

15. The display panel according to claim 14, wherein the temperature detection structure is S-shaped, the temperature detection structure comprises a plurality of long-segment structures and a plurality of short-segment structures, the short-segment structure is connected between two long-segment structures, a length of the long-segment structure is greater than a length of the short-segment structure, and at least one of the long-segment structures overlaps two of the pixel circuits.

16. The display panel according to claim 14, wherein the pixel circuits comprise a first pixel circuit and a second pixel circuit, the light-emitting devices comprises first light-emitting device and a second light-emitting device that have different light-emitting colors, the first pixel circuit is configured for driving the first light-emitting device, and the second pixel circuit is configured for driving the second light-emitting device, and the temperature detection structure overlaps both the first pixel circuit and the second pixel circuit.

17. The display panel according to claim 9, wherein the drive circuit layer comprises:

the temperature detection structure located on a side of the substrate;

an active layer of the transistor, located on a side of the temperature detection structure away from the substrate;

a gate layer of the transistor, located on a side of the active layer away from the substrate;

a capacitor plate layer located on a side of the gate layer away from the substrate;

a first electrode of the transistor, connected to the active layer through a contact via hole, the first electrode is located on a side of the capacitor plate layer away from the substrate;

a transfer connection electrode located on a side of the first electrode away from the substrate; and a contact electrode connected to the light-emitting device, the contact electrode is connected to the first electrode of the transistor through the transfer connection electrode, and the first connection electrode and the second connection electrode are provided in a same layer as at least one of the gate layer, the capacitor plate layer, the first electrode, the transfer connection electrode, and the contact electrode; or wherein the transistors comprise a first-type transistor and a second-type transistor, the first-type transistor comprises a first active layer and a first gate, the second-type transistor comprises a second active layer and a second gate, a first electrode of the first-type transistor is connected to the first active layer, a first electrode of the second-type transistor is connected to the second active layer, and the first electrode of the first-type transistor and the first electrode of the second-type transistor are provided in a same layer; and the drive circuit layer comprises:

the temperature detection structure located on a side of the substrate;

the first active layer located on a side of the temperature detection structure away from the substrate;

the first gate located on a side of the first active layer away from the substrate;

a capacitor plate layer located on a side of the first gate away from the substrate;

the second active layer located on a side of the capacitor plate layer away from the substrate;

the second gate located on a side of the second active layer away from the substrate;

the first electrode of the second-type transistor, located on a side of the second gate away from the substrate;

a transfer connection electrode located on a side of the first electrode of the second-type transistor away from the substrate; and a contact electrode connected to the light-emitting device, the contact electrode is connected to the first electrode of the first-type transistor or the first electrode of the second-type transistor through the transfer connection electrode, and the first connection electrode and the second connection electrode are provided in a same layer as at least one of the first active layer, the second active layer, the first gate, the second gate, the capacitor plate layer, the first electrode, the transfer connection electrode, and the contact electrode.

18. The display panel according to claim 9, wherein a plurality of light-emitting devices comprise a first light-emitting device, a second light-emitting device, and a third light-emitting device that have different light-emitting colors; and a plurality of the temperature detection structures comprise a first temperature detection structure, a second temperature detection structure, and a third temperature detection structure; and in a thickness direction of the display panel, at least a part of the first light-emitting device overlaps the first temperature detection structure, at least a part of the second light-emitting device overlaps the second temperature detection structure, and at least a part of the third light-emitting device overlaps the third temperature detection structure.

19. A display apparatus, comprising a display panel, wherein the display panel comprises:

a temperature detection structure, a first connection electrode, a second connection electrode, and a plurality of auxiliary temperature detection structures connected to the temperature detection structure;

wherein the temperature detection structure is connected to the first connection electrode and the second connection electrode, respectively; and wherein the plurality of auxiliary temperature detection structures and the temperature detection structure are provided in different layers, and wherein the first connection electrode and the second connection electrode are connected to the temperature detection structure through the plurality of auxiliary temperature detection structures.

20. A display apparatus, comprising a display panel, wherein the display panel comprises:

a temperature detection structure, a first connection electrode, a second connection electrode, a substrate, a drive circuit layer, and a light-emitting device, wherein the temperature detection structure is connected to the first connection electrode and the second connection electrode, respectively; and wherein the drive circuit layer is located on the substrate, and the drive circuit layer comprises a transistor, the light-emitting device is located on the drive circuit layer, the drive circuit layer comprises the temperature detection structure, the first connection electrode, and the second connection electrode, and wherein the transistor comprises an active layer, and the temperature detection structure is located between a film layer where the active layer is located and the substrate.

* * * * *